United States Patent [19]
Yamada

[11] Patent Number: 5,883,724
[45] Date of Patent: *Mar. 16, 1999

[54] METHOD AND APPARATUS FOR PROCESSING IMAGE DATA FROM A PLURALITY OF SOURCES AND FOR FORMING A PLURALITY OF IMAGES ON A PHOTOSENSITIVE DRUM BASED ON THE PROCESSED IMAGE DATA

[75] Inventor: Masanori Yamada, Inagi, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 785,968

[22] Filed: Jan. 22, 1997

Related U.S. Application Data

[63] Continuation of Ser. No. 411,885, Mar. 28, 1995, abandoned.

[30] Foreign Application Priority Data

Mar. 29, 1994 [JP] Japan ..................................... 6-058633

[51] Int. Cl.$^6$ ....................................................... H04N 1/32
[52] U.S. Cl. ......................... 358/442; 358/296; 358/401; 358/437; 355/127; 399/169; 395/117
[58] Field of Search ..................................... 358/442, 445, 358/447, 448, 468, 471, 296, 401, 490, 491; 355/89, 114–127, 79; 399/87, 168, 169–179, 382, 391; 395/101, 112, 114, 111, 117; H04N 1/32

[56] References Cited

U.S. PATENT DOCUMENTS

| | | | |
|---|---|---|---|
| 3,909,818 | 9/1975 | Dalke et al. | 340/324 |
| 4,236,813 | 12/1980 | Levine | 355/14 |
| 4,734,760 | 3/1988 | Futaki | 358/75 |
| 4,884,104 | 11/1989 | Yoshida | 355/202 |
| 4,941,170 | 7/1990 | Herbst | 358/402 |
| 5,040,031 | 8/1991 | Hayashi | 355/326 |
| 5,200,830 | 4/1993 | Imaizumi et al. | 358/437 |
| 5,325,209 | 6/1994 | Manabe | 358/437 |
| 5,335,056 | 8/1994 | Muramatsu | 355/327 |
| 5,410,642 | 4/1995 | Hakamatsuka et al. | 395/113 |
| 5,475,500 | 12/1995 | Takeda | 358/401 |
| 5,528,374 | 6/1996 | Matias | 358/296 |
| 5,528,758 | 6/1996 | Yeh | 395/200.08 |
| 5,537,598 | 7/1996 | Kukula et al. | 395/700 |
| 5,548,789 | 8/1996 | Nakamura | 395/853 |

FOREIGN PATENT DOCUMENTS 0369429  5/1990  European Pat. Off. .

Primary Examiner—Edward L. Coles
Assistant Examiner—Madeleine Au Nguyen
Attorney, Agent, or Firm—Fitzpatrick, Cella, Harper & Scinto

[57] ABSTRACT

Since an image processing apparatus of this invention can record images input from a plurality of image sources on a plurality of recording media simultaneously held on a recording medium holding member, the images input from the plurality of image sources can be efficiently output, and the productivity of the image processing apparatus can be improved.

77 Claims, 19 Drawing Sheets

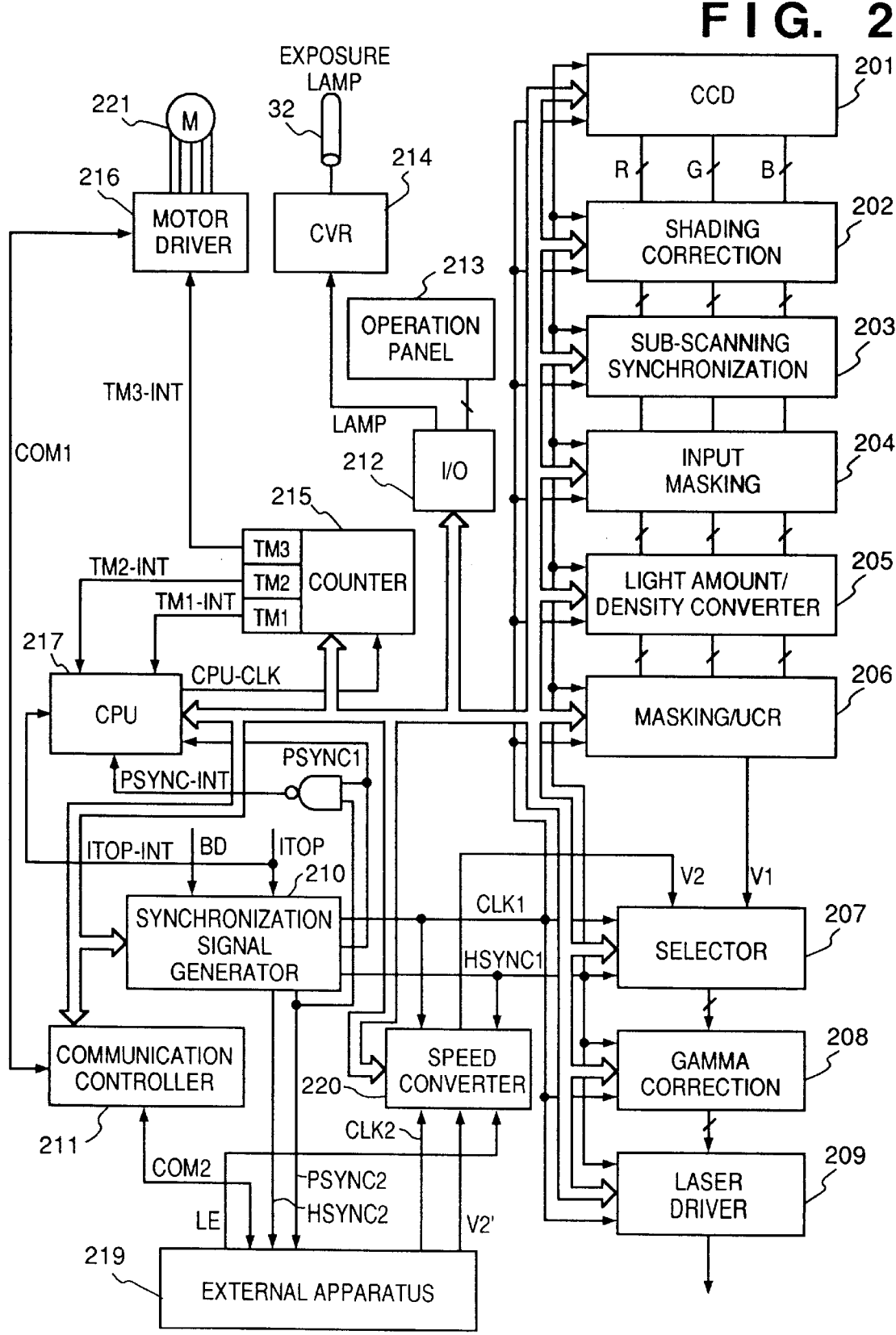

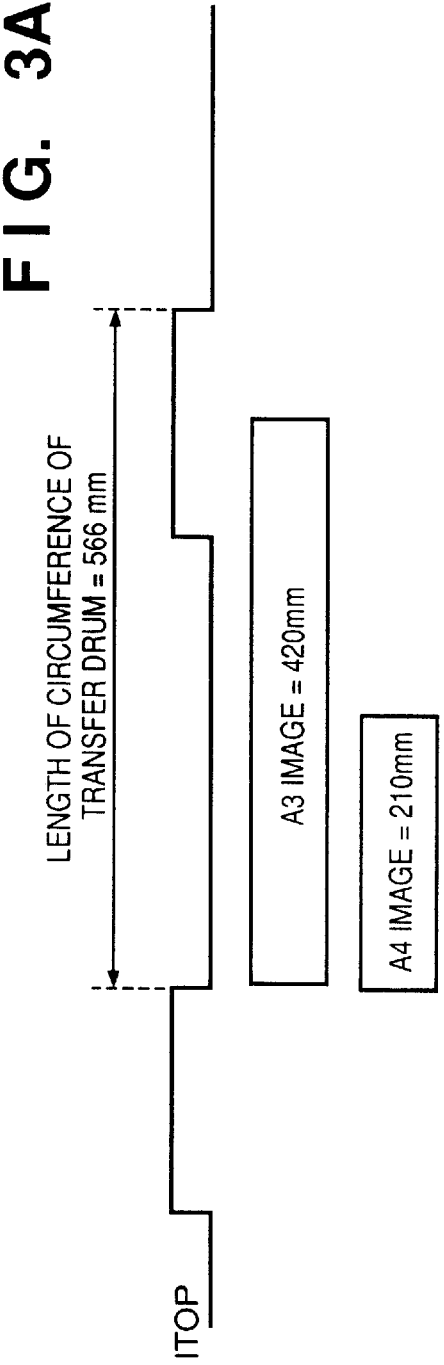
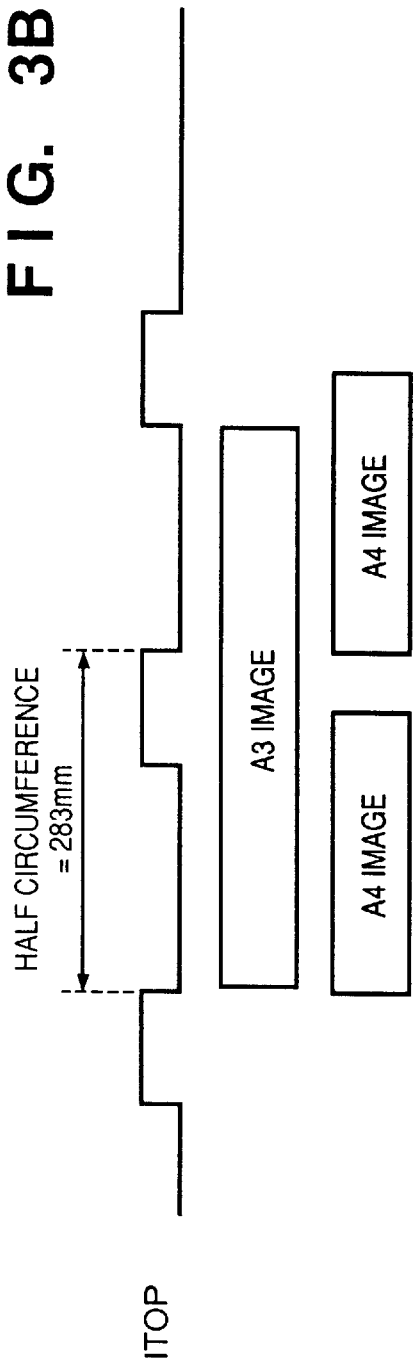

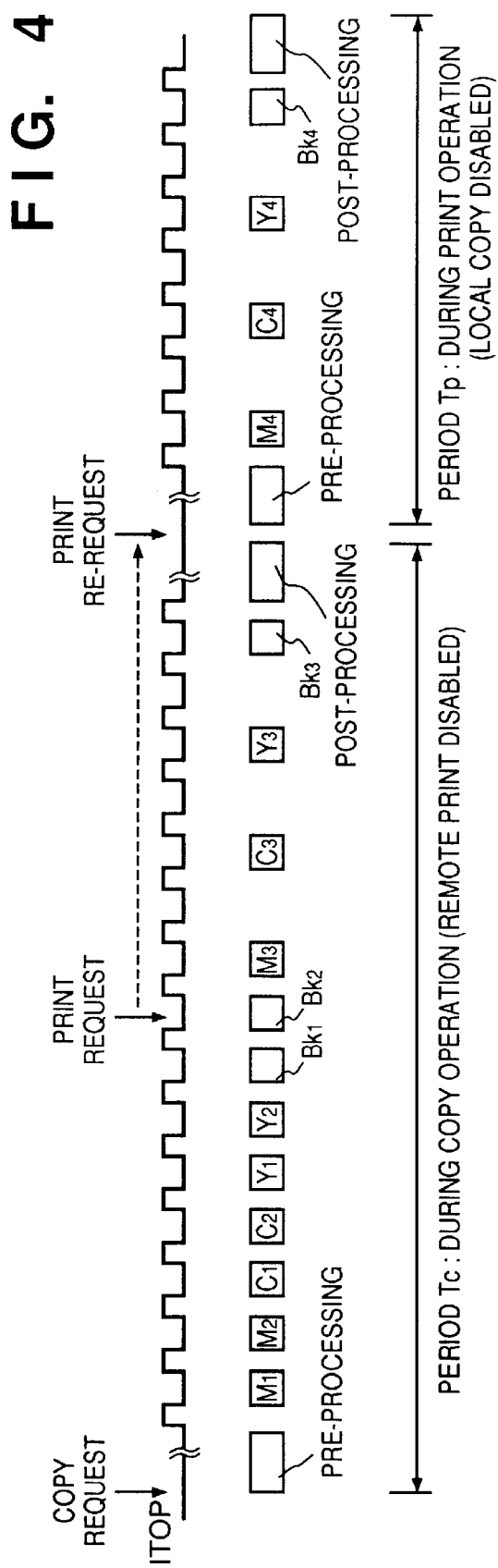

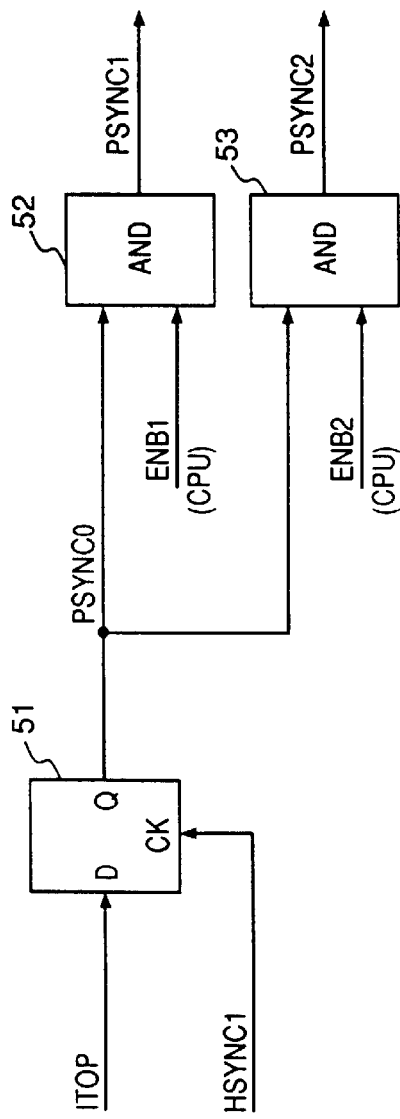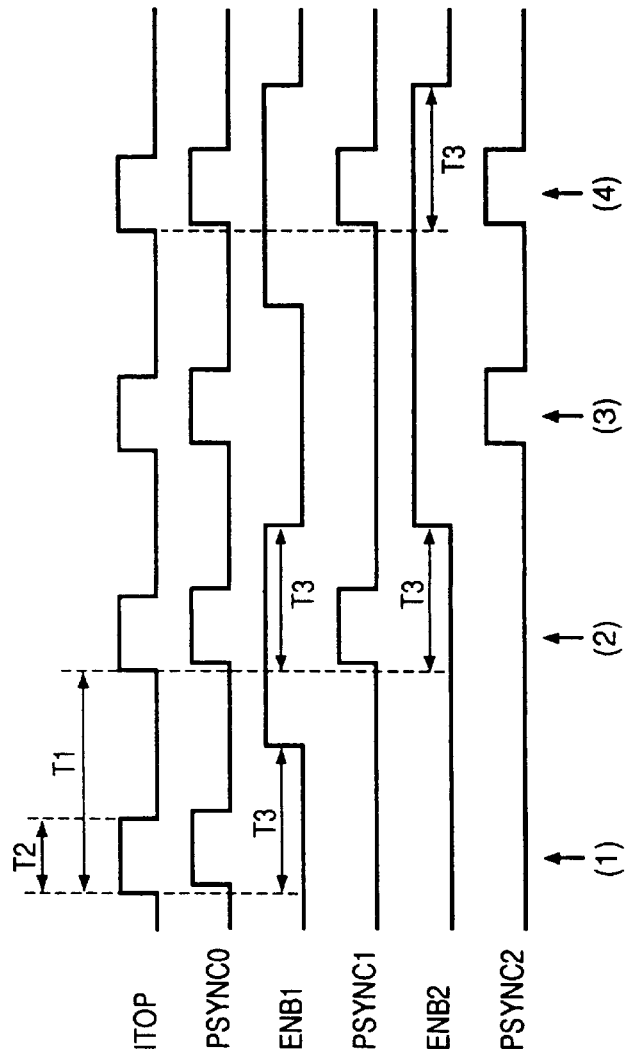
FIG. 5A
FIG. 5B-1 ITOP
FIG. 5B-2 PSYNC0
FIG. 5B-3 ENB1
FIG. 5B-4 PSYNC1
FIG. 5B-5 ENB2
FIG. 5B-6 PSYNC2

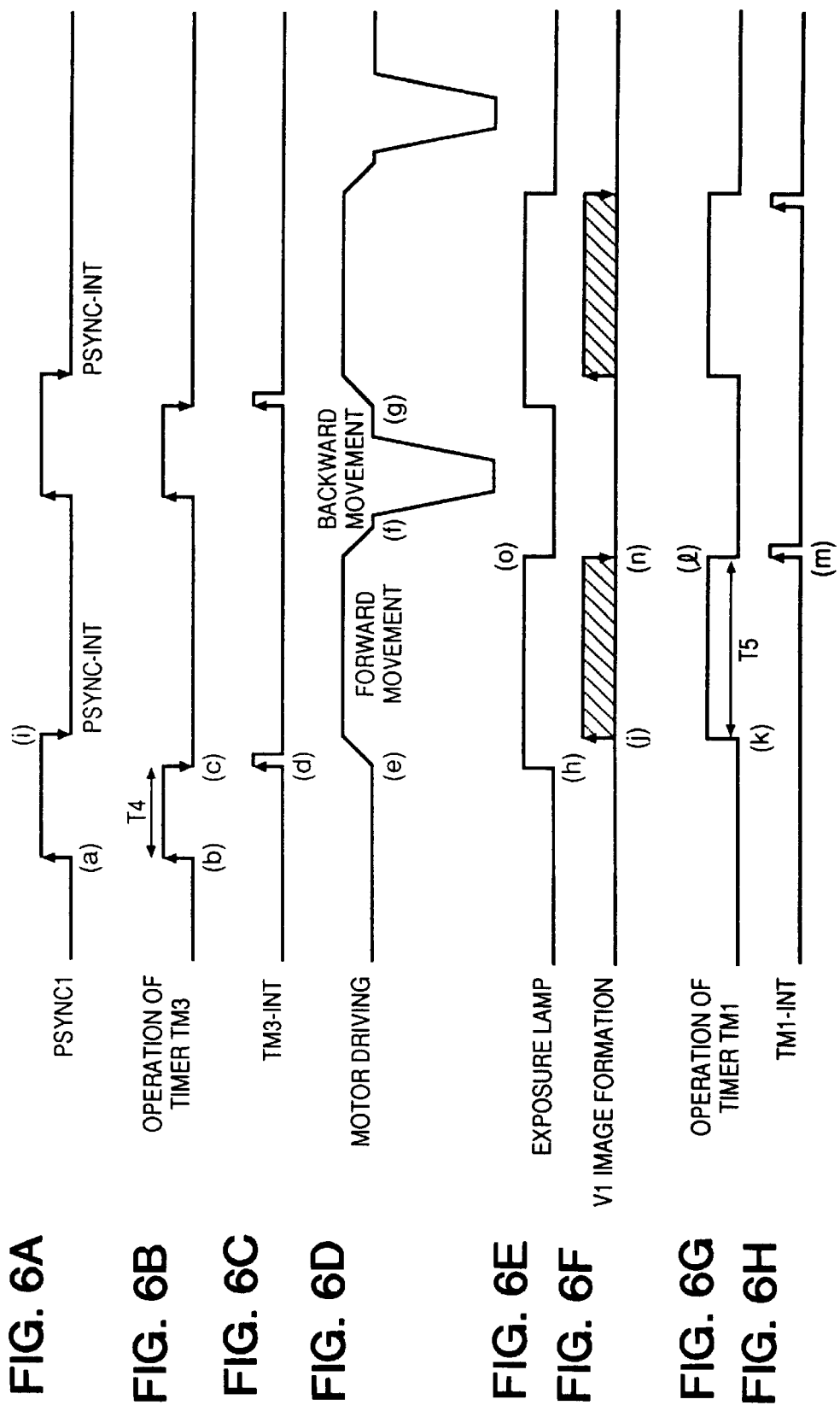

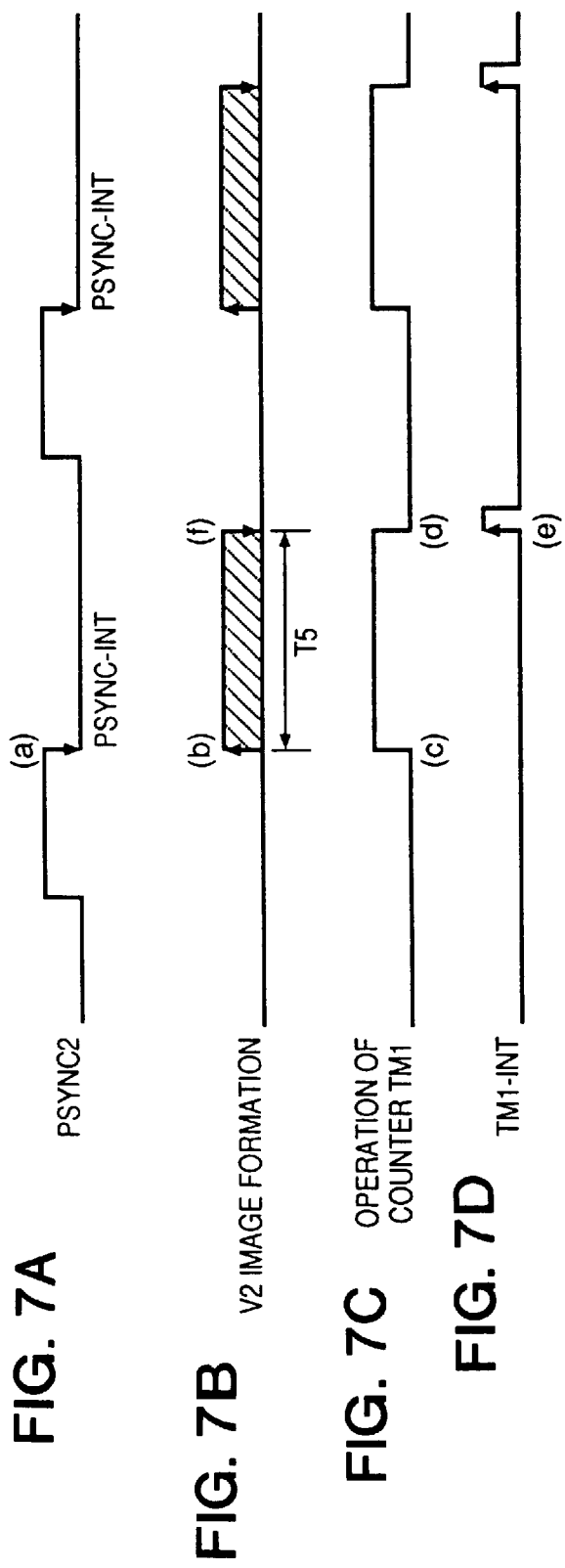

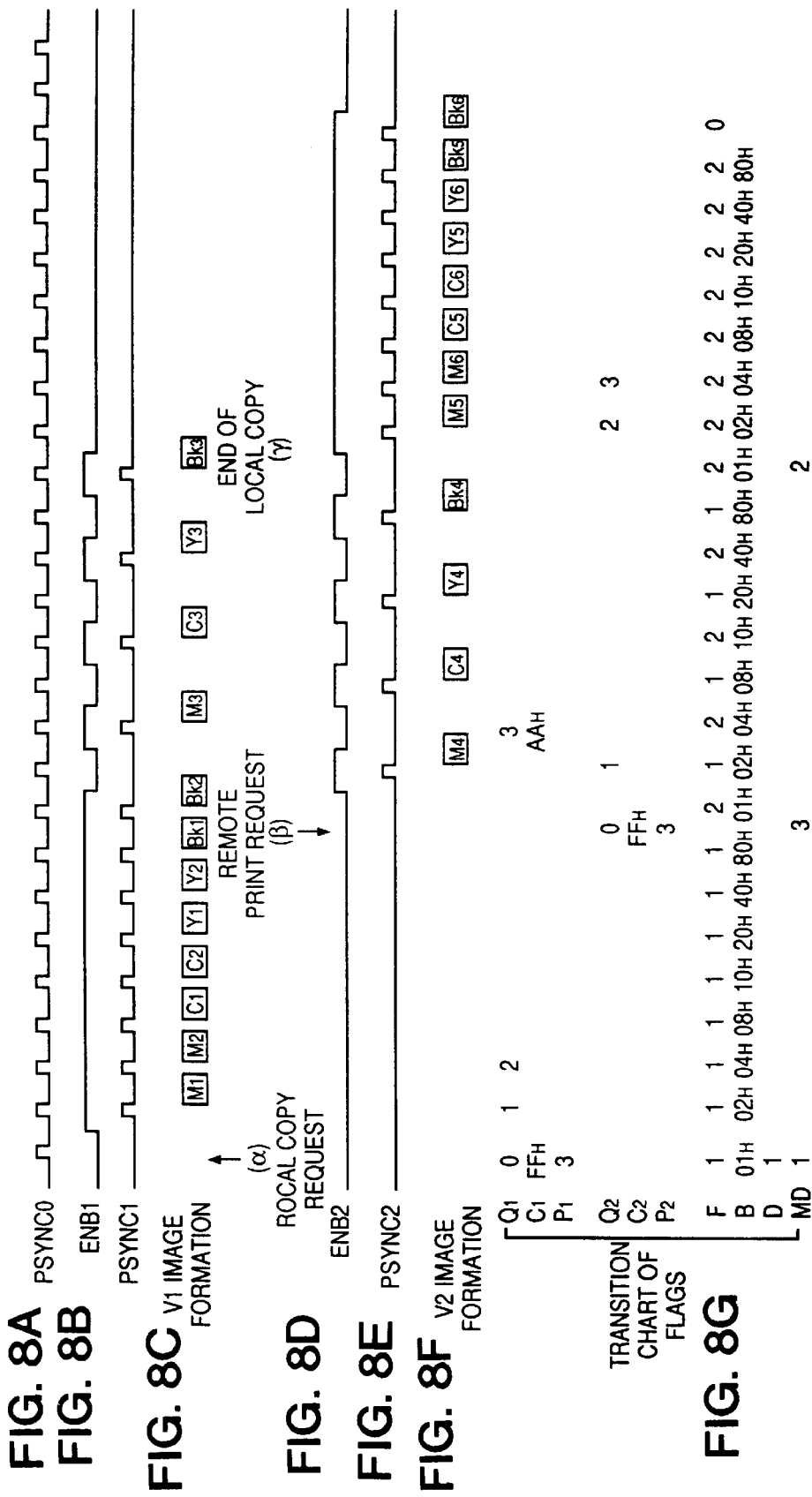

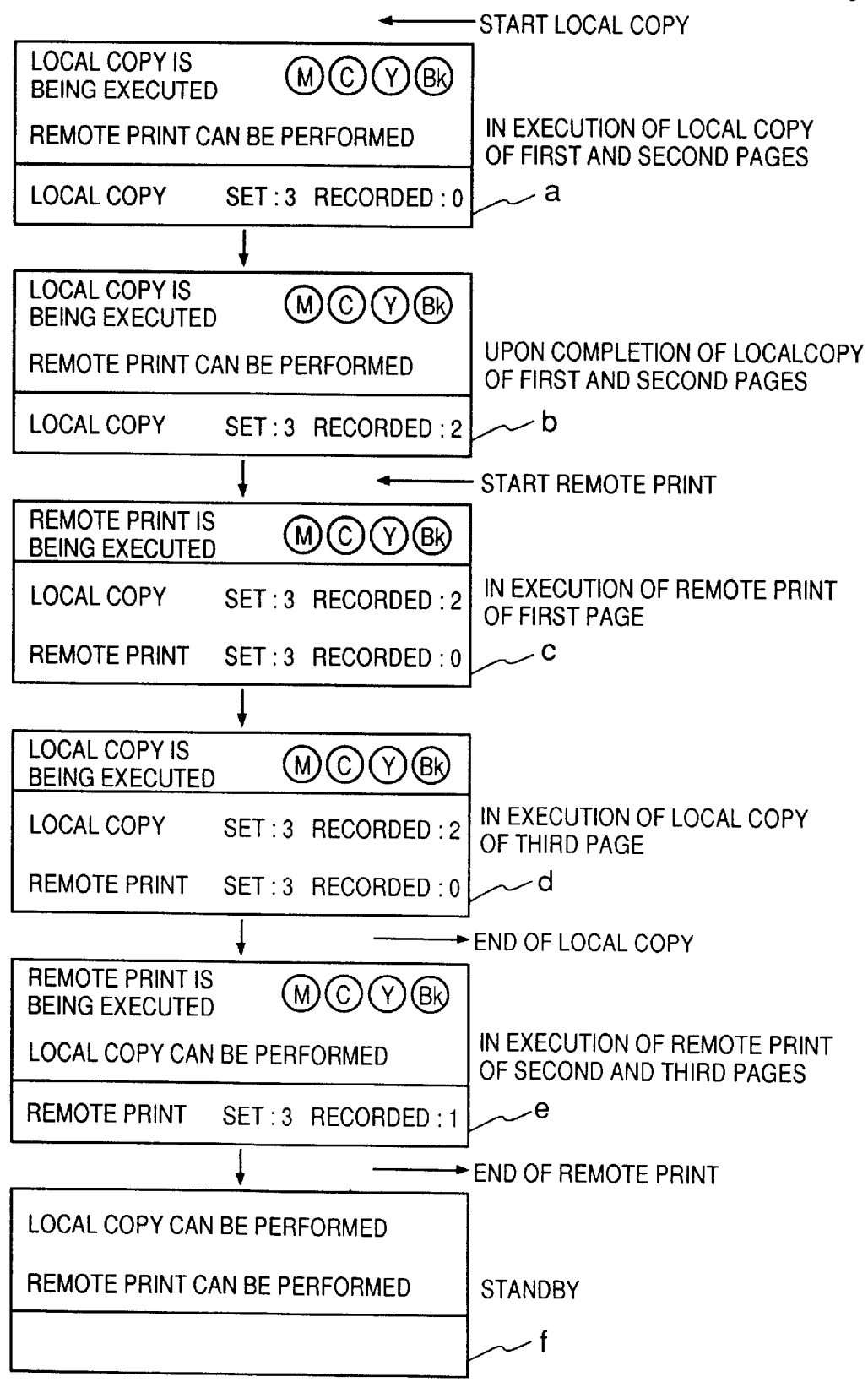

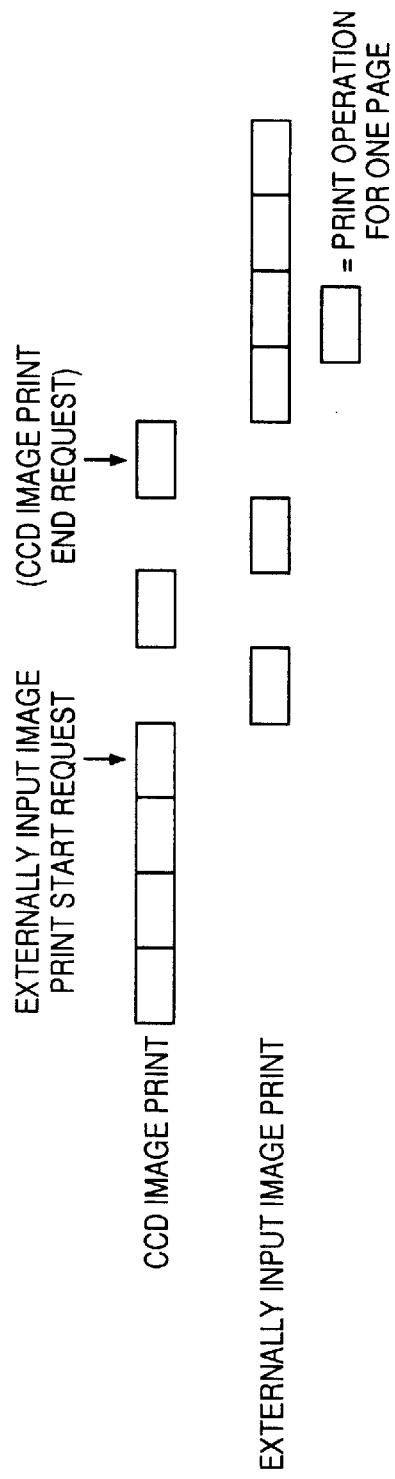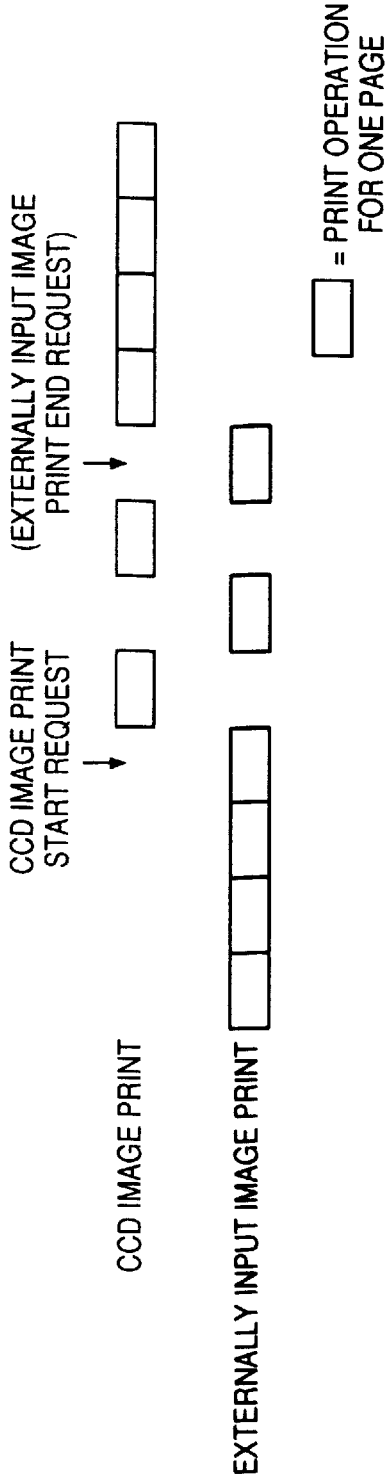

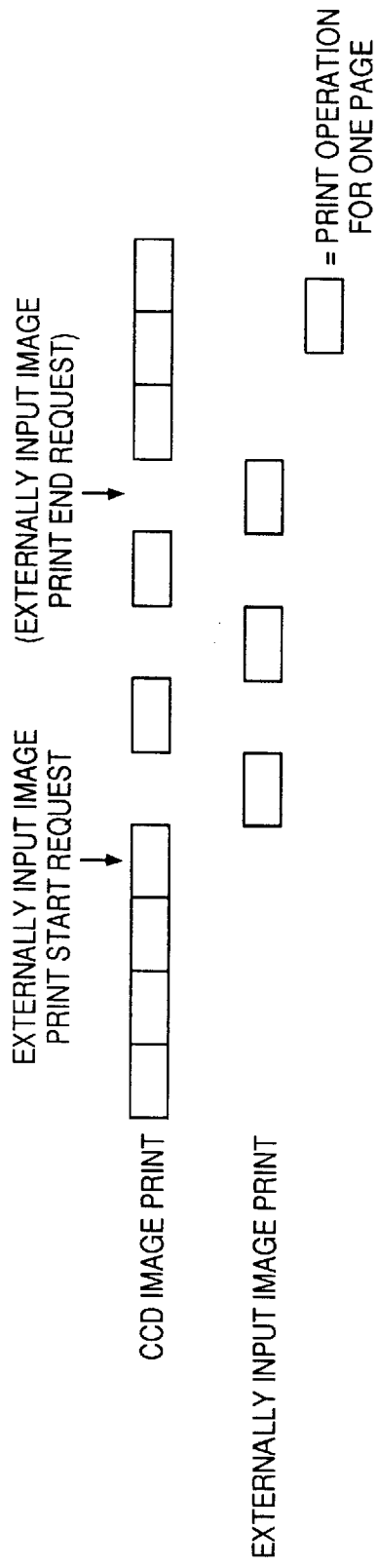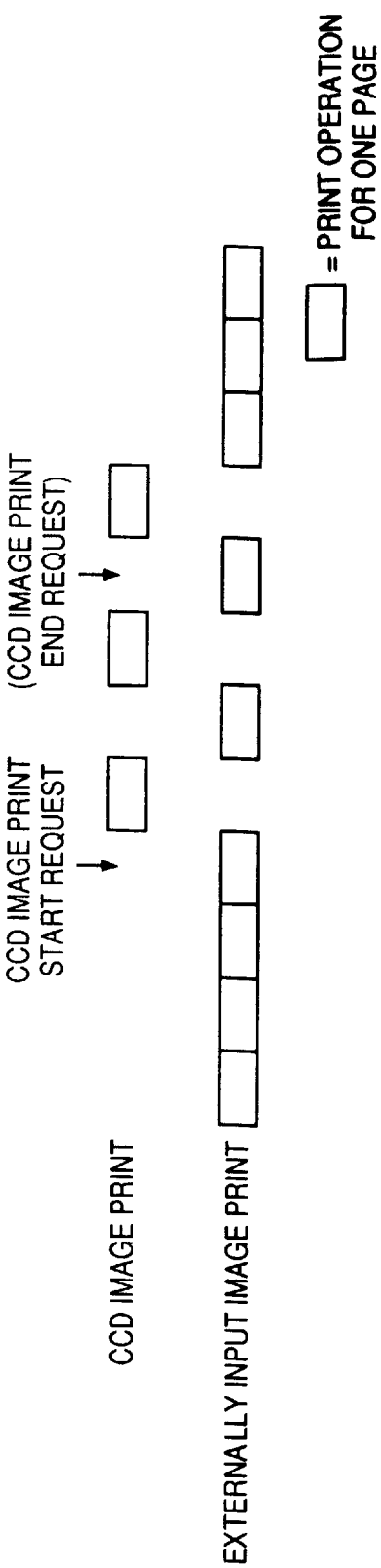

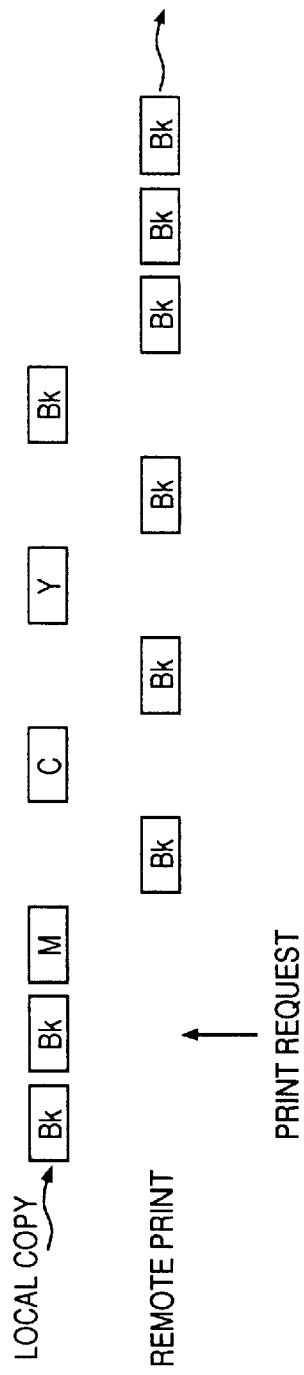
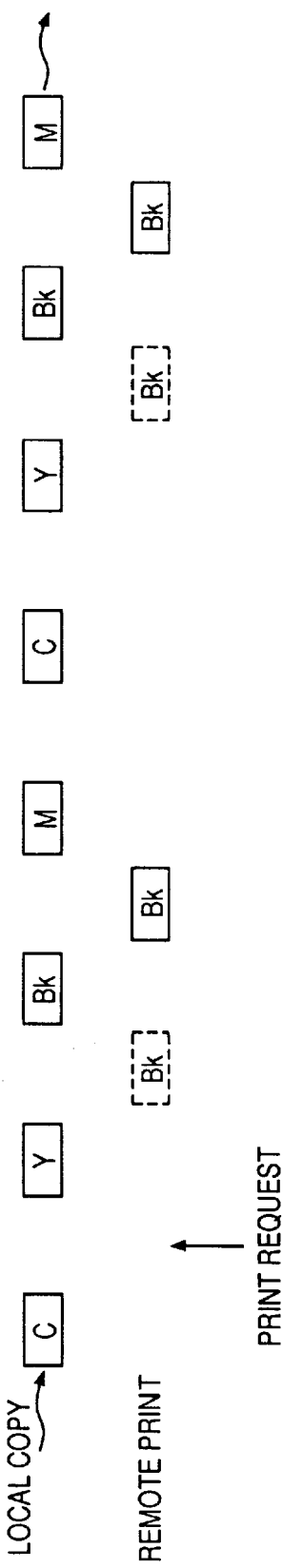

METHOD AND APPARATUS FOR PROCESSING IMAGE DATA FROM A PLURALITY OF SOURCES AND FOR FORMING A PLURALITY OF IMAGES ON A PHOTOSENSITIVE DRUM BASED ON THE PROCESSED IMAGE DATA

This application is a continuation, of application Ser. No. 08/411,885 filed Mar. 28, 1995.

BACKGROUND OF THE INVENTION

This invention relates to an image processing apparatus and method and, more particularly, to an image processing apparatus and method, which can perform a color image print operation based on a plurality of image sources.

In recent image processing apparatuses, a composite image processing apparatus which has a plurality of functions, i.e., a copy function, print-out function, facsimile transmission/reception function, filing function, and the like, is commercially available. Most of conventional image processing apparatuses each having a plurality of functions are based on monochrome printers. However, in recent years, a color composite image processing apparatus, which comprises, e.g., an interface with external devices, and has a color image print function, has been proposed.

However, since an image processing apparatus based on especially a multiple transfer type color copying machine frame-sequentially develops four colors (magenta, cyan, yellow, and black), the print time required for printing an image on one sheet is to four times that of a monochrome printer, resulting in low productivity.

When an external device such as a host computer or the like issues a print request to the image processing apparatus which is executing a copy operation of an original image, the print operation of an image requested by the external apparatus is performed after four-color print processing of the original image, or vice versa. Therefore, when a color print operation is performed, an operator must wait for a longer queue time of a print job than the monochrome printer.

SUMMARY OF THE INVENTION

It is an object of the present invention to provide an image processing apparatus and method, which can process color print requests from at least two information sources within a shortest period of time.

According to the present invention, the foregoing object is attained by providing an image processing apparatus comprising plurality of input means for inputting image signals, image forming means for forming plurality of images on the basis of the image signals input from the plurality of input means, and output means for sequentially outputting the plurality of images formed by the image forming means in units of pages.

In accordance with the present invention as described above, since images input from the at least two input means can be efficiently processed, high productivity can be obtained.

It is another object of the present invention to provide an image processing apparatus and method, which can process color print requests from two information sources within a shortest period of time.

According to the present invention, the foregoing object is attained by providing an image processing apparatus comprising first input means for inputting a first image signal, second input means for inputting a second image signal, image forming means for forming a first image based on the first image signal and forming a second image based on the second image signal, and output means for alternately outputting the first and second images formed by the image forming means in units of pages.

In accordance with the present invention as described above, since images input from the two input means such as a scanner, an external apparatus, and the like can be efficiently processed, high productivity can be obtained.

Furthermore, the apparatus comprises priority comparison means for comparing the priority levels of the first and second input means, and the output means preferentially outputs an image input from the input means with higher priority on the basis of the comparison result of the priority comparison means.

With the above arrangement, since the output order can be controlled in accordance with a predetermined priority of the input means, flexible output control can be realized.

Furthermore, the apparatus comprises informing means for informing image information which is being output by the output means.

With the above arrangement, since an operator can recognize the current processing state, an image processing apparatus with higher operability can be provided.

The invention is particularly advantageous since images input from a plurality of image sources can be respectively recorded on a plurality of recording media simultaneously held on recording medium holding member. For this reason, images input from the plurality of image sources can be efficiently output, and the productivity of the image processing apparatus can be improved. In addition, since the output state is informed, improvements in operability can also be expected.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing the detailed arrangement of an image processing unit in the first embodiment;

FIGS. 3A and 3B are charts for explaining an image forming method in the first embodiment;

FIG. 4 is a chart for explaining the image forming sequence in the first embodiment;

FIGS. 5A and 5B are respectively a block diagram and a timing chart for explaining the detailed arrangement of a synchronization signal generator in the first embodiment;

FIG. 6 is a timing chart of the image forming operation in a local copy operation in the first embodiment;

FIG. 7 is a timing chart of the image forming operation in a remote print operation in the first embodiment;

FIG. 8 shows a timing chart of parallel image forming operations and a transition chart of control flags in the first embodiment;

FIG. 16 is a view showing display examples of an operation panel in parallel processing of the first embodiment;

FIGS. 17A and 17B are views for explaining the parallel image forming operations according to the second embodiment of the present invention;

FIGS. 18A and 18B are views for explaining the parallel image forming operations in the second embodiment;

FIGS. 19A and 19B are views for explaining the parallel image forming operations in the second embodiment;

DESCRIPTION OF THE PREFERRED EMBODIMENTS

Preferred embodiments of the present invention will now be described in detail in accordance with the accompanying drawings.

First Embodiment

Figure 1:
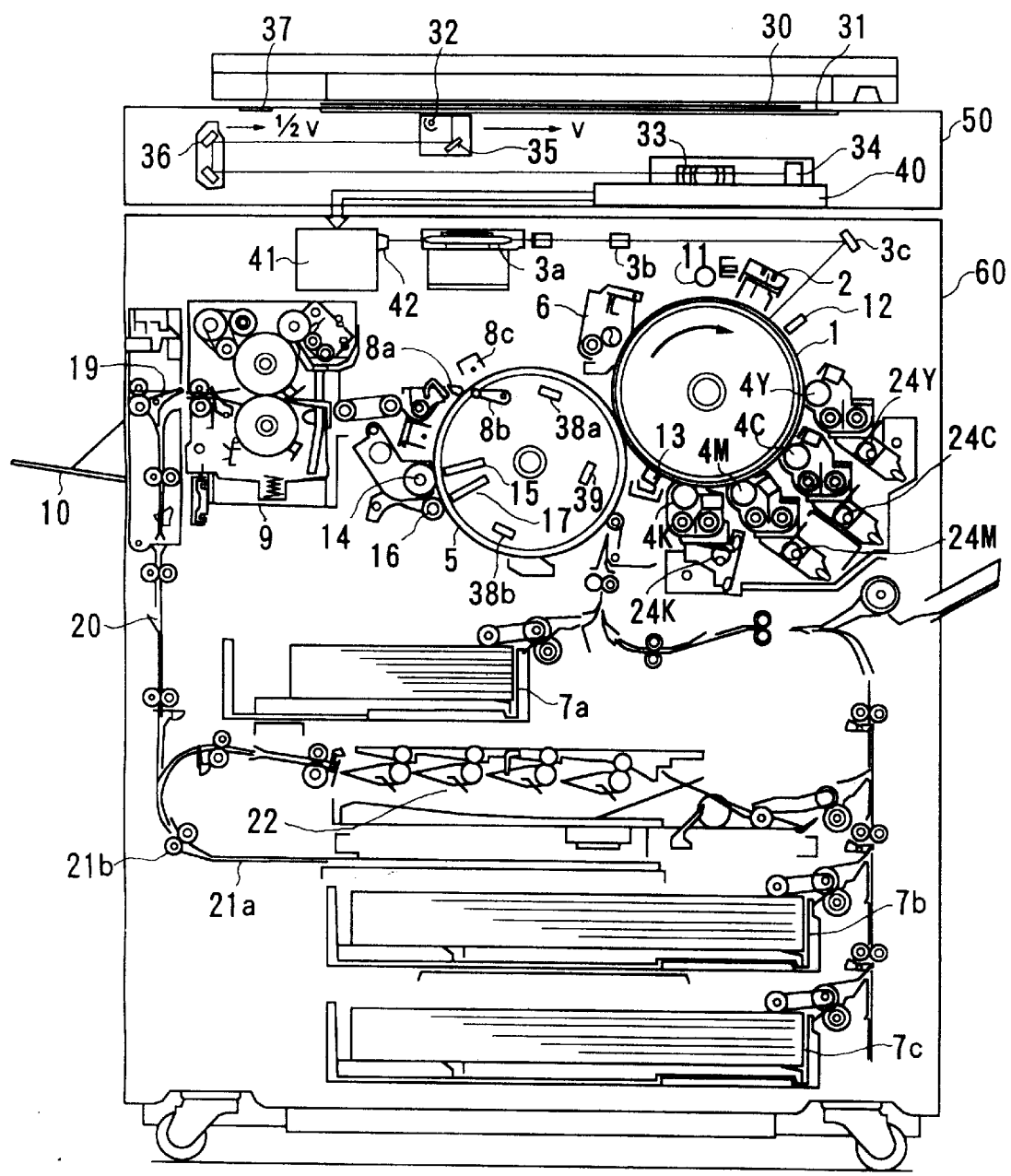
FIG. 1 is a sectional view of a color image processing apparatus according to the first embodiment of the present invention.

FIG. 1 is a sectional view of a color image processing apparatus of this embodiment.

As shown in FIG. 1, the color image processing apparatus of this embodiment has a digital color image reader unit (to be referred to as a reader unit hereinafter) 50 in its upper portion, and a digital color image printer unit (to be referred to as a printer unit hereinafter) 60 in its lower portion.

In the reader unit 50, an original 30 is placed on an original glass plate 31, and is exposed and scanned by an exposure lamp 32. An optical image defined by light reflected by the original 30 is formed on a full-color sensor 34 by a lens 33 via mirrors 35 and 36, thus obtaining color-separated image signals. The color-separated image signals obtained by the full color sensor (comprising, e.g., a CCD; to be referred to as a CCD hereinafter) 34 are subjected to various image processing operations in an image processing unit 40 (to be described later) via an amplifier (not shown), and the processed signals are output to the printer unit 60. Note that reference numeral 37 denotes a standard white plate, and a detailed description thereof will be given later.

In the printer unit 60, a photosensitive drum 1 as an image carrier is carried to be rotatable in the direction of an arrow in FIG. 1. A pre-exposure lamp 11, a corona charger 2, a laser exposure optical system (3a, 3b, and 3c), a potential sensor 12, four developers 4Y, 4C, 4M, and 4K of different colors, a drum light amount detector 13, a transfer drum 5, and a cleaning device 6 are arranged around the photosensitive drum 1.

Each of the image signals obtained by the reader unit 50 is converted into an optical signal by a laser output unit 41. In the laser exposure optical system (3a, 3b, and 3c), a laser beam output from a laser 42 is reflected by a polygonal mirror 3a, and is projected as an optical image 43 onto the surface of the photosensitive drum 1 via a lens 3b and a mirror 3c.

In the image forming operation in the printer unit 60, the photosensitive drum 1 is rotated in the direction of the arrow in FIG. 1, the photosensitive drum 1, which has been discharged by the pre-exposure lamp 11, is uniformly charged by the charger 2, and an optical image 43 for each separated color is irradiated onto the drum surface, thus forming a latent image.

The developer of a predetermined color is operated to develop the latent image on the photosensitive drum 1, thereby forming a resin-based toner image on the photosensitive drum 1. The developers alternatively approach the photosensitive drum 1 upon operation of eccentric cams 24Y, 24C, 24M, and 24K.

The toner image on the photosensitive drum 1 is transferred onto a recording medium, which is fed from a recording medium cassette 7a, 7b, or 7c to a position opposing the photosensitive drum 1 via a convey system and the transfer drum 5. The transfer drum 5 is rotatably supported, and a recording medium carrier sheet cylindrically and integrally extends on the circumferential opening of the drum 5. Upon rotation of the transfer drum 5, a desired number of color images (toner images) on the photosensitive drum 1 are transferred on the recording medium carried on the recording medium carrier sheet by a charger and rollers (neither are shown), thus forming a full-color image.

In the case of full-color image formation, upon completion of transfer of the four color toner images, as described above, the recording medium is peeled from the transfer drum 5 upon operation of a peeling pawl 8a, a peeling push-up roller 8b, and a peeling charger 8c, and is discharged onto a tray 10 via a heat roller fixing device 9.

On the other hand, after the transfer, the residual toner on the surface of the photosensitive drum 1 is cleaned by the cleaning device 6, and the drum 1 is subjected to the next image forming process.

When images are to be formed on the two surfaces of the recording medium, a convey path switching guide 19 is driven immediately after the recording medium exits the fixing device 9, and is temporarily guided to a reversal path 21a via a vertical convey path 20. Thereafter, upon rotating reversal rollers 21b in the opposite direction, the recording medium leaves the path with the trailing end, when it is fed into the path, leading, i.e., in a direction opposite to the feed direction, and is stored in an intermediate tray 22. Thereafter, an image is formed on the other surface of the recording medium by executing the above-mentioned image forming processing again.

In order to prevent scattering/attachment of toner powder on the recording medium carrier sheet of the transfer drum 5 and attachment of an oil onto the recording medium, the transfer drum 5 is cleaned upon operation of a fur brush 14 and a backup brush 15 which opposes the brush 14 via the recording medium carrier sheet, or upon operation of an oil removal roller 16 and a backup brush 17 which opposes the roller 16 via the recording medium carrier sheet. This cleaning operation is performed before or after image formation, and is performed as needed when a jam (paper jam) has occurred.

Reference numeral 39 denotes an image leading end sensor. When signal plates 38a and 38b cross the sensor 39, an image leading end signal ITOP is generated. The plate 38a and 38b are located at opposing angular positions separated by 180°, and two signals ITOP are generated per revolution of the transfer drum 5.

The image processing unit 40 shown in FIG. 1 will be described in detail below with reference to FIG. 2.

FIG. 2 is a block diagram showing the detailed arrangement of the image processing unit 40 shown in FIG. 1. Image signals photoelectrically converted by the CCD 34 in FIG. 1 are subjected to gain control and offset adjustment in a CCD processor 201, and are converted by an A/D converter (not shown) into 8-bit digital image signals R, G, and B in units of color signals. In the following description, the CCD processor 201 will be simply referred to as a CCD 201. Thereafter, the image signals are input to a shading correction unit 202, and are subjected to known shading correction in units of colors using a signal obtained by reading the standard white plate 37 shown in FIG. 1. Since R, G, and B light-receiving portions of the CCD 34 are arranged to be separated from each other by a predetermined distance, any spatial deviation, in the sub-scanning direction, of the image signals is corrected by a sub-scanning synchronization processor 203 comprising a line delay element.

Reference numeral 204 denotes an input masking unit, which corrects variations in R, G, and B filters of the CCD 34. Reference numeral 205 denotes a light amount/density converter, which comprises a look-up table ROM (or RAM), and converts luminance signals R, G, and B into density signals C, M, and Y. Reference numeral 206 denotes a known masking & UCR unit, which selects one of output signals Y, M, C, and Bk as a signal V1 from the input three primary signals Y, M, and C, and sequentially outputs the signal V1 of a predetermined bit length (e.g., 8 bits) in each reading operation. The detailed description of the unit 206 will be omitted. Reference numeral 207 denotes a selector for selecting an image signal to be recorded. The selector 207 selects one of the CCD reading image signal V1 and an image signal V2 from an external apparatus 219 (to be described later) at an arbitrary timing in accordance with a signal from a CPU 217.

Reference numeral 208 denotes a known gamma correction unit for attaining image recording with a desired density/gradation in correspondence with the characteristics of the printer. Reference numeral 209 denotes a laser driver, which converts each digital image signal into, e.g., a pulse-modulated analog signal, and drives the laser output unit 41 shown in FIG. 1.

Reference numeral 217 denotes a CPU, which drives a motor 221 for reciprocally moving an optical system, constituted by the lamp 32 and the mirrors 35 and 36 shown in FIG. 1, via a motor driver 216. The CPU 217 performs light amount control and ON/OFF control of the exposure lamp 32 via a CVR (Constant Voltage Regulator; lamp regulator) 214, and also controls an operation panel 213 via an I/O unit 212. Note that the CPU includes known devices such as a RAM, ROM, and the like.

A communication controller 211 controls communications with the motor driver 216 and an external apparatus 219. In this embodiment, the communications with the external apparatus 219 include reception of information such as a paper size and color mode upon recording of an image signal, and a recording start/end command, and transmission of status data of the reader unit 50 and the printer unit 60 to the external apparatus 219. Reference numeral 210 denotes a synchronization signal generator, which generates clocks CLK1 in units of pixels, line synchronization signals HSYNC1 and HSYNC2, and synchronization signals PSYNC1 and PSYNC2 in units of pages on the basis of the signals ITOP generated in synchronism with the rotation of the transfer drum 5 and a signal BD generated in synchronism with the rotation of a polygonal mirror. Reference numeral 220 denotes a speed converter for converting an image signal V2' which is supplied from the external apparatus 219 in synchronism with pixel clocks CLK2 and an image effective period signal LE for one line into an image signal V2 which is synchronized with the internal pixel clocks CLK1 and the line synchronization signal HSYNC1.

A counter 215 has three counters for counting clocks CPU-CLK from the CPU 217 by predetermined counts, and generates interrupt signals TM1-INT, TM2-INT, and TM3-INT to be supplied to the CPU 217 and the motor driver 216. These signals will be described in detail later.

The relationship between the above-mentioned signals and an output image will be explained below with reference to FIGS. 3A to 4.

FIGS. 3A and 3B show the relationship between the signal ITOP output from the image leading end sensor 39 shown in FIG. 1 and an image.

Normally, as a method of adhering the recording medium on the transfer drum 5, the end of the recording medium is clamped by grippers arranged on the transfer drum 5, thereby fixing the recording medium. In this case, the relationship between the signal ITOP and an image is as shown in FIG. 3A. In FIG. 3A, if the diameter of the transfer drum is about 180 mm, the length of the circumference of the transfer drum is about 566 mm, and each of an A3 image for one color having a sub-scanning length=420 mm and an A4 image for one color having a sub-scanning length=210 mm is formed on one recording medium per revolution of the transfer drum 5. Note that one period of the signal ITOP represents one circumference of the transfer drum in a conventional image processing apparatus.

In contrast to this, in the present invention, since the recording medium is electrostatically attracted on the transfer drum, no grippers are required, and the signal ITOP is generated every half circumference of 283 mm of the transfer drum 5, as described above. Therefore, as shown in FIG. 3B, an A3 image for one color is formed in response to two signals ITOP, and an A4 image for one color is formed in response to one signal ITOP. For this reason, a processing speed twice that in the conventional apparatus can be obtained for an A4 image. A function of attaching two recording media with a predetermined size on the transfer drum will be a "two-sheet attraction" function hereinafter. The attraction position of one of two sheets to be attracted will be referred to as an "A surface" hereinafter, and the other position will be referred to as a "B surface" hereinafter.

FIG. 4 shows the conventional relationship between the signals ITOP and image forming operations from a plurality of image sources in the above-mentioned two-sheet attraction function. In this embodiment, a recording operation of an image read from the CCD 201 upon operation of the operation panel 213 will be referred to as a copy or local copy operation hereinafter, and a recording operation of an image input from the external apparatus 219 will be referred to as a print or remote print operation hereinafter. FIG. 4 shows an example wherein a remote print request is issued during the recording operation for a local copy request of three pages.

Referring to FIG. 4, when a copy request is detected, after predetermined pre-processing, image recording operations are performed for the first two pages in the order of M1, M2, C1, C2, Y1, Y2, Bk1, and Bk2 in units of signals ITOP. More specifically, the copy operation is performed using the two-sheet attraction function. Then, a remote print request is accepted. In this case, the local copy operation, which has already been started, is preferentially performed, and the image recording operation is performed for the last page of the local copy operation in the order of M3, C3, Y3, and Bk3 in units of two signals ITOP, i.e., by a one-sheet attraction function. Thereafter, post-processing is performed. During a period Tc of the local copy operation, since the print operation cannot be executed in response to a remote print request from the external apparatus 219, a message indicating this print disabled state is supplied to the external apparatus 219. Therefore, the external apparatus 219 issues a remote print request again when the post-processing of the local copy operation is completed and the printer is ready. At last, the image processing apparatus of this embodiment starts pre-processing for a remote print operation, and performs image recording in the order of M4, C4, Y4, and Bk4 in units of two signals ITOP. Similarly, during this print operation period Tp, a local copy request from the operation panel 213 is not accepted.

The detailed arrangement of the synchronization signal generator 210 shown in FIG. 2, in particular, generation of the page synchronization signals PSYNC1 and PSYNC2 will be explained below with reference to FIGS. 5A and 5B.

FIG. 5A is a block diagram showing the detailed structure of the synchronization signal generator 210. The signal ITOP which is generated in synchronism with the rotation of the transfer drum 5 is synchronized with the line synchronization signal HSYNC1 by a latch 51, thus generating a signal PSYNC0. The signal PSYNC0 is input to AND gates 52 and 53 to be locally ANDed to two enable signals ENB1 and ENB2 supplied from the CPU 217, respectively, thus generating signals PSYNC1 and PSYNC2. The page synchronization signal PSYNC1 is used for an image from the CCD 201, i.e., the local copy operation, and the page synchronization signal PSYNC2 is used for recording of an image from the external apparatus 219, i.e., the remote print operation.

FIG. 5B is a timing chart of the signals shown in FIG. 5A.

The enable signals ENB1 and ENB2 supplied from the CPU 217 serve as gate signals of the signal PSYNC0, and are turned on or off after an elapse of a time T3 from the leading edge of the signal ITOP. The time T3 is equal to or longer than an AND period T2 of the signals ITOP and PSYNC0, and is equal to or shorter than an ITOP period time T1. The time T3 is measured by a timer TM2 arranged in the counter 215 shown in FIG. 2 from the leading edge of the signal ITOP, and is assured by an interrupt signal TM2-INT to the CPU 217.

The CPU can control the signals ENB1 and ENB2 to arbitrarily obtain four different combinations of ON/OFF states of the signals PSYNC1 and PSYNC2, i.e., four states (1), (2), (3), and (4) shown in FIG. 5B. In FIG. 5B, state (1) represents a state wherein both the signals PSYNC1 and PSYNC2 are at L level; state (2) represents a state wherein the signal PSYNC1 is at H level and the signal PSYNC2 is at L level; state (3) represents a state wherein the signal PSYNC1 is at L level and the signal PSYNC2 is at H level; and state (4) represents a state wherein both the signals PSYNC1 and PSYNC2 are at H level.

The local copy sequence in this embodiment will be described below with reference to FIG. 6. FIG. 6 particularly shows the driving sequence of the motor 221 for scanning the optical system constituted by the exposure lamp 32 and the mirrors 35 and 36, and the ON/OFF control sequence of the exposure lamp 32.

FIG. 6 is a timing chart showing the control operations of the exposure lamp 32 and the motor 221. Referring to FIG. 6, simultaneously with the leading edge (a) of the page synchronization signal PSYNC1 for local copy, a timer TM3 arranged in the counter 215 (FIG. 2) starts measurement ((b)). After measurement of a time T4 ((c)), the timer TM3 generates an interrupt signal TM3-INT ((d)), and supplies it to the motor driver 216. Then, since the motor 221 rises at a predetermined acceleration ((e)), the optical system rises at a predetermined acceleration. When the moving speed of the optical system has reached a desired speed, the optical system moves forward at a low speed. After the optical system scans a predetermined distance, it decelerates at the same rate as that upon rising ((f)), and stops. Thereafter, the optical system starts backward movement, and stops at a forward movement start position ((g)) to wait for the interrupt signal TM3-INT for the next scan. Also, the exposure lamp 32 is turned on in synchronism with the interrupt signal TM3-INT ((h)).

The trailing edge (i) of the signal PSYNC1 is used as an interrupt signal PSYNC-INT to the CPU, as shown in FIG. 2, and image formation based on an image signal V1 is started in synchronism with the trailing edge of the signal PSYNC1 ((j)). Furthermore, an image period time T5 from the generation timing of the signal PSYNC-INT is measured by a timer TM1 arranged in the counter 215 shown in FIG. 2 ((k)). Upon completion of measurement of T5 ((l)), in response to the leading edge (m) of an interrupt signal TMI-INT, image formation is completed in a desired duration ((n)) and the exposure lamp 32 is turned off ((o)).

With the above-mentioned sequence, the local copy processing of this embodiment is performed.

The remote print sequence in this embodiment will be described below with reference to FIG. 7.

FIG. 7 is a timing chart showing the relationship between the page synchronization signal PSYNC2 and image formation in the remote print operation. Since an image from the external apparatus 219 is formed regardless of the acceleration time of the motor 221 and the rise time of the exposure lamp 32, the remote print operation is performed using only the timer TM1.

Referring to FIG. 7, the interrupt signal PSYNC-INT is generated at the trailing edge (a) of the signal PSYNC2, and image formation based on an image signal V2 is started in synchronism with the interrupt signal PSYNC-INT ((b)). The timer TM1 arranged in the counter 215 (FIG. 2) measures an image period time T5 from the generation timing of the interrupt signal PSYNC-INT ((c)). Upon completion of measurement of T5 ((d)), in response to the leading edge of the interrupt signal TMI-INT ((e)), image formation is completed in a desired duration ((f)).

The sequence for performing image forming operations from a plurality of image sources in this embodiment, i.e., the sequence when the above-mentioned local copy operation and remote print operation are simultaneously performed will be described below with reference to FIG. 8.

FIG. 8 is a timing chart of the signals upon simultaneous execution of the local copy operation and the remote print operation. The sequence upon reception of a remote print request of three pages during local copy processing of three pages will be described below. Note that various flags are used for controlling the sequences in this embodiment, and FIG. 8 also shows the transition states of flags (to be described in detail later).

Referring to FIG. 8, when a local copy request of three pages is generated for an image V1 from the CCD 201 ((α)), the predetermined pre-processing is performed, and thereafter, image recording is performed for the first two pages in the order of M1, M2, C1, C2, Y1, Y2, Bk1, and Bk2 in units of signals PSYNC1. When a remote print request of three pages is received (((β)) during this image recording, the remote print operation of this embodiment is started before the end of the local copy operation.

After (β), the local copy operation of the third page and the remote print operation of the first page are performed. The corresponding recording media are simultaneously electrostatically attracted on the transfer drum 5 (two-sheet attachment), and an image V2 from the external apparatus 219 is formed in synchronism with the signals PSYNC2. More specifically, image formation is alternately performed in the order of M4, M3, C4, C3, Y4, Y3, Bk4, and Bk3 in units of developing colors in FIG. 8.

In FIG. 8, after the end of the local copy operation of the third page ((γ)), the remote print operation of the second and third pages is executed. This sequence is realized by generation control of the page synchronization signals PSYNC1 and PSYNC2 by gating the page synchronization signal PSYNC0 using the enable signals ENB1 and ENB2 from the CPU 217.

More specifically, when the remote print request (β) is issued, the first and second images V1 and V2 are alternately transferred onto the recording media, which are two-sheet-attached to the transfer drum 5, in units of colors in synchronism with the page synchronization signals PSYNC1 for local copy and the page synchronization signals PSYNC2 for remote print, respectively.

As described above, in FIG. 8, upon recording of the third page of the local copy operation, since only one recording medium need be attracted on the transfer drum 5, recording of an image from another image source can be executed without wasting the remaining half circumferential portion of the transfer drum 5 and without executing pre- or post-rotation of the drum, thus improving the productivity of the image processing apparatus of this embodiment.

Figure 9:
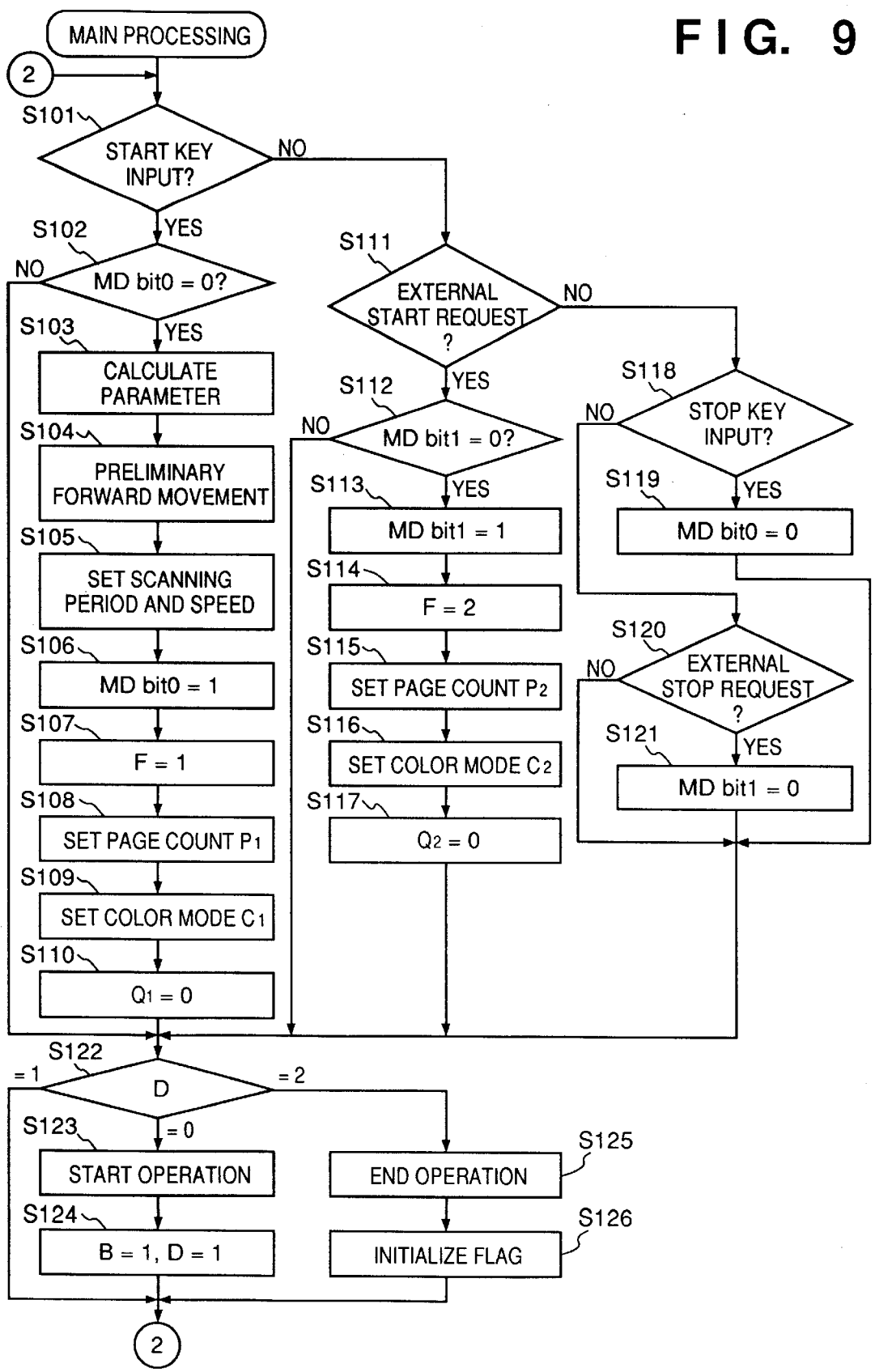
FIG. 9 is a flow chart showing the main processing of the parallel image forming operations in the first embodiment.

FIG. 9 is a flow chart showing the main sequence control upon execution of the local copy operation and the remote print operation in this embodiment. This control will be described below.

In step S101 in FIG. 9, the presence/absence of input of the start key on the operation panel 213 is checked. If YES in step S101, the flow advances to step S102 to check if the 0th bit of a flag MD on the RAM is "0" to discriminate if the local copy or remote print operation is selected. If YES in step S102, various parameters for the operation are calculated in step S103, and the optical system is preliminarily moved forward to the original scan start position in step S104. In step S105, a scanning period and speed are set in the motor driver 216. In step S106, the 0th bit of the flag MD is set to be "1". In step S107, a flag F on the RAM, which flag is used for discriminating an image source to be subjected to next recording, is set to be "01H". Note that "01H" in hexadecimal notation represents "01". The flow then advances to step S108 to set a recording page count in an area P1 on the RAM. In step S109, a color mode is set in an area C1 on the RAM. In step S110, an area Q1 on the RAM, which area stores a recorded page count, is cleared to "0". Thereafter, the flow advances to step S122.

Figure 10:
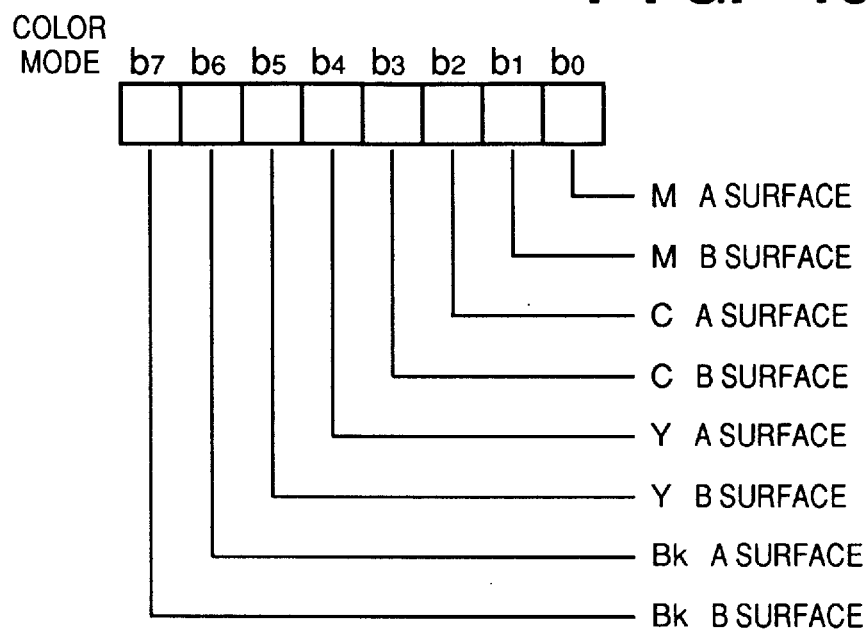
FIG. 10 is a view for explaining a color mode in the first embodiment.

FIG. 10 shows in detail the color mode C1 set in step S109. Referring to FIG. 10, the color mode has an 8-bit configuration, the 0th and 1st bits (b0, b1) correspond to magenta, the 2nd and 3rd bits (b2, b3) correspond to cyan, the 4th and 5th bits (b4, b5) correspond to yellow, and the 6th and 7th bits (b6, b7) correspond to black. The 0th, 2nd, 4th, and 6th bits correspond to the A surface in the case of "two-sheet attachment", and the 1st, 3rd, 5th, and 7th bits correspond to the B surface.

If it is determined in step S101 in FIG. 9 that an input operation of the start key is not detected, the flow advances to step S111. In step S111, the presence/absence of a remote print start request from the external apparatus 219 is checked. If YES in step S111, it is checked in step S112 if the 1st bit of the flag MD is "0". If YES in step S112, the 1st bit of the flag MD is set to be "1" in step S113, and the above-mentioned flag F is set to be "02H" in step S114. The flow advances to step S115 to set a recording page count in an area P2 on the RAM. In step S116, a color mode is set in an area C2 on the RAM. In step S117, an area Q2 on the RAM, which area stores a recorded page count, is cleared to "0". Thereafter, the flow advances to step S122. Note that the flag C2 representing the color mode is the same as C1 described above.

Note that the 0th bit of the flag MD means a local copy request, and its 1st bit means a remote print request. While "1" is set in each bit, it indicates that the corresponding recording operation is requested and is not completed yet. If the flag F is "01H", an input image from the CCD 201 is subjected to the next recording; if the flag F is "02H", an image input from the external apparatus 219 is subjected to the next recording.

If it is determined in step S111 that a remote print request is not detected, the flow advances to step S118 to check the presence/absence of input of the stop key on the operation panel 213. If YES in step S118, the flow advances to step S119 to set the 0th bit of the flag MD to be "0", and the flow advances to step S122. That is, the local copy processing is cleared. On the other hand, if NO in step S118, the flow advances to step S120 to check if a print stop request is issued from the external apparatus 219. If YES in step S120, the 1st bit of the flag MD is set to be "0" in step S121, and the flow advances to step S122. That is, the remote print processing is cleared. However, if NO in step S120, the flow advances to step S122.

On the other hand, if it is determined in step S102 that the 0th bit of the flag MD is not "0" or if it is determined in step S112 that the 1st bit of the flag MD is not "0", the flow also advances to step S122.

In step S122, a flag D on the RAM, which flag is cleared to "0" in initialization and represents the current recording operation status, is checked. If the flag D is "0", since it is determined that a recording operation is not being executed currently, a recording operation is started in step S123. In step S124, the flag D is set to be "1" and a color mode flag B on the RAM, which flag indicates the developing color, is set to be "1". Thereafter, the flow returns to step S101. Note that the color mode flag B has the same bit configuration as those of the color mode flags C1 and C2, but only one of 8 bits is always "1".

On the other hand, if it is determined in step S122 that the flag D is "1", since a recording operation is being executed currently, the flow returns to step S101 to continue processing. If it is determined in step S122 that the flag D is "2", since it indicates the end of a recording operation, the color mode flag B and the flag D are cleared to "0" in step S126, and the flow returns to step S101.

Note that the above-mentioned flags are also updated in respective interrupt processing operations to be described below.

The interrupt processing operations for the above-mentioned main sequence of the recording operation will be described below with reference to FIGS. 11 to 15.

Figure 11:
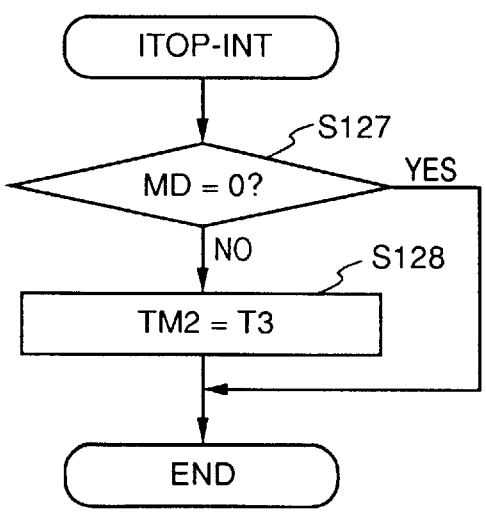
FIG. 11 is a flow chart showing the interrupt processing by an image leading end signal ITOP in the first embodiment.

FIG. 11 is a flow chart of the interrupt processing to the CPU 217 by a signal ITOP-INT which is simultaneously generated in response to the leading edge of the signal ITOP.

In step S127, it is checked if the value of the flag MD is "00H", i.e., if both the 0th and 1st bits of the flag MD are "0". If NO in step S127, the flow advances to step S128 to set the above-mentioned time T3 in the timer TM2 used for generating the enable signals ENB1 and ENB2, thereby starting measurement.

Figure 12:
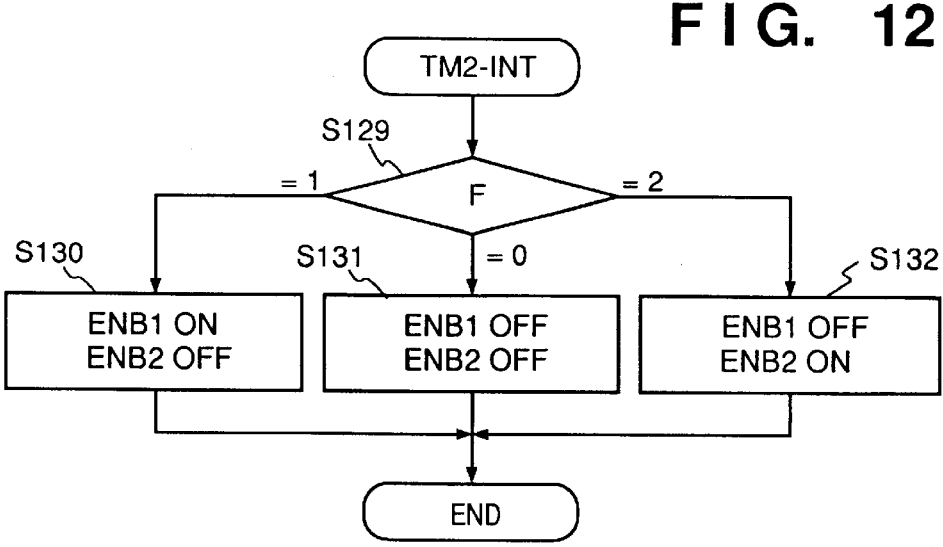
FIG. 12 is a flow chart showing the interrupt processing by a timer TM2 in the first embodiment.

If the timer TM2 has finished the measurement of the time T3, the interrupt signal TM2-INT changes to H level. FIG. 12 is a flow chart showing the interrupt processing by the interrupt signal TM2-INT.

Referring to FIG. 12, the flag F indicating an image source is checked in step S129. If it is determined in step S129 that the flag F is "01H", since the selected processing is local copy processing, the flow advances to step S130 to turn on the enable signal ENB1 and to turn off the enable signal ENB2. If it is determined in step S129 that the flag F is "02H", since the selected processing is remote print processing, the enable signal ENB1 is turned off and the enable signal ENB2 are turned on in step S132. If it is determined in step S129 that the flag F is "00H", since the recording operations from all image sources have been finished, both the enable signals ENB1 and ENB2 are turned off in step S131.

The interrupt processing generated when the page synchronization signal PSYNC1 changes to H level will be described below with reference to FIG. 13.

Figure 13:
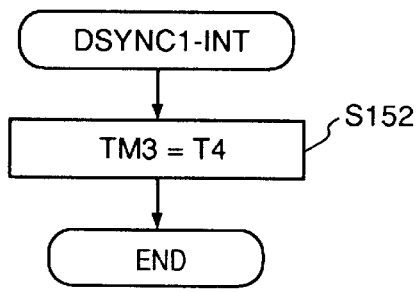
FIG. 13 is a flow chart showing the interrupt processing by a page synchronization signal PSYNC1 in the first embodiment.

Referring to FIG. 13, in step S152, the above-mentioned time T4 is set in the above-mentioned timer TM3 to generate the driving start timing of the motor 221 for driving the optical system, and the measurement of T4 is started.

The interrupt processing generated when the interrupt signal TM1-INT from the timer TM1 which indicates the end of recording of one color for one page changes to H level will be described below with reference to FIG. 14.

Figure 14:
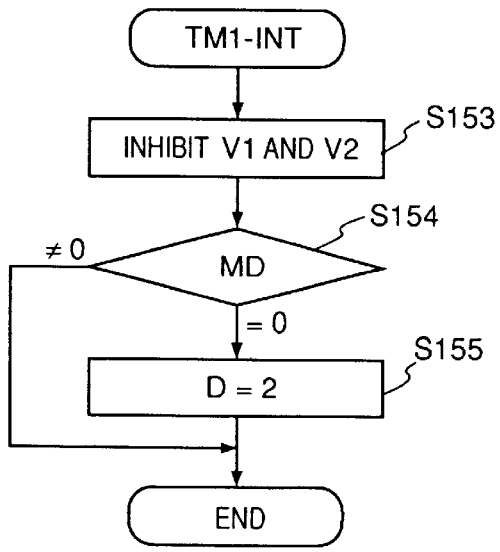
FIG. 14 is a flow chart showing the interrupt processing by a timer TM1 in the first embodiment.

Referring to FIG. 14, since this interrupt processing generates the recording end timing of one color for one page, the recording operation is inhibited regardless of the image V1 or V2 in step S153. In step S154, the value of the flag MD is checked. If the value of the flag MD is "00H", since a recording operation need not be performed, the flag D is set to be "2" to indicate the end of operation in step S155. On the other hand, if it is determined in step S154 that the value of the flag MD is not "00H", the interrupt processing ends.

Figure 15:
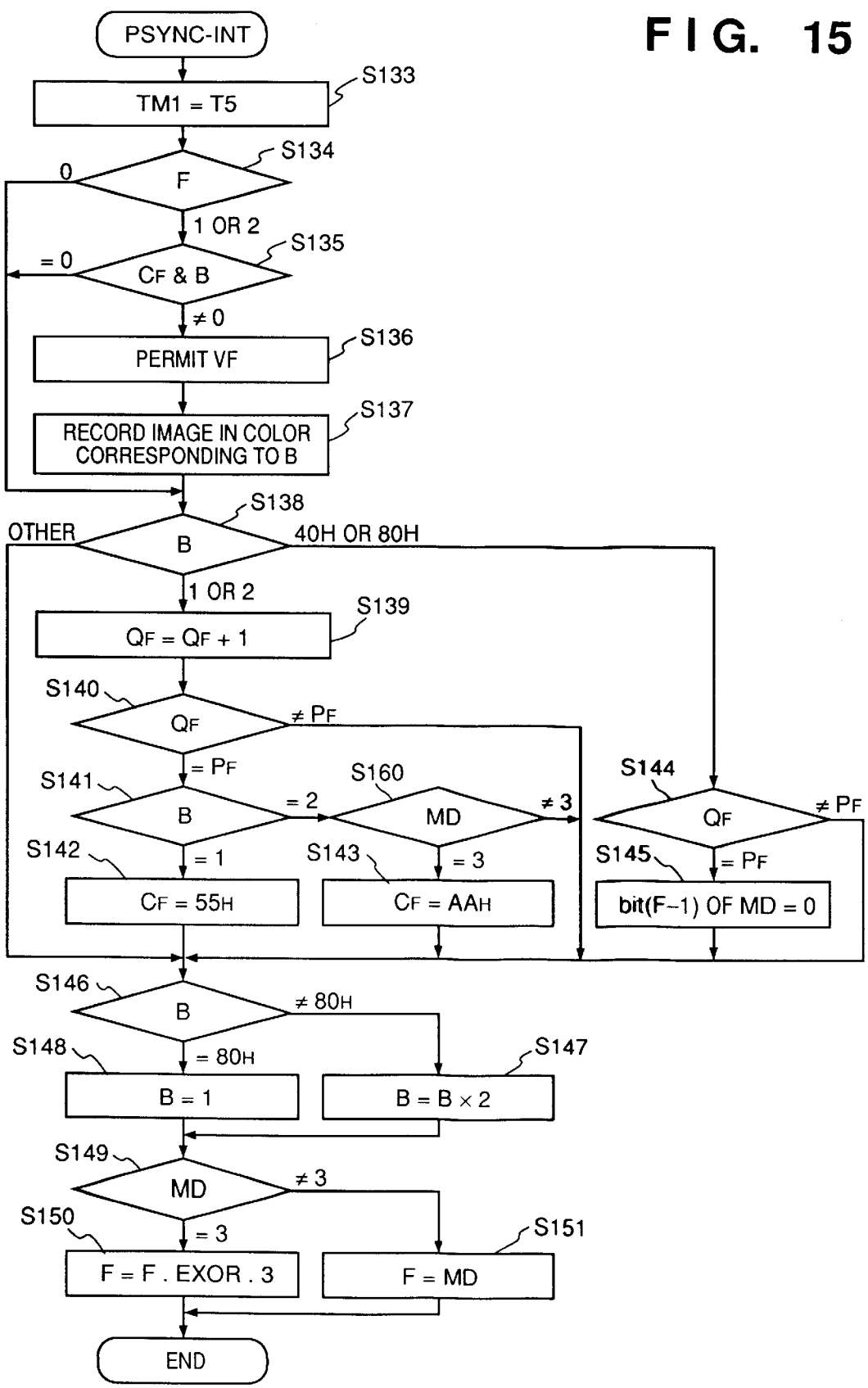
FIG. 15 is a flow chart showing the interrupt processing by a page synchronization signal PSYNC in the first embodiment.

The interrupt processing generated when the interrupt signal PSYNC-INT, which is generated by the NAND of the page synchronization signals PSYNC1 and PSYNC2, changes to H level will be described below with reference to FIG. 15.

The signal PSYNC-INT indicates detection of the leading end of an image. In step S133, the above-mentioned image period time T5 is set in the above-mentioned timer TM1 for counting the trailing end of an image. In step S134, the flag F indicating an image source is checked. If it is determined in step S134 that the flag F is "01H" or "02H", since there is a possibility of image recording, the flow advances to step S135. In the following description, by adding the flag F as a suffix of each of other flags, an image source indicated by each flag is indicated. For example, "$C_F$" represents the flags $C_1$ and $C_2$, $C_1$ indicates local copy, and $C_2$ indicates remote print.

In step S135, the AND of the color mode flag $C_F$ indicating set colors and the color mode flag B indicating the developing color is calculated. More specifically, if the flag F is "01H", the AND of the color mode flag $C_1$ and the color mode flag B is calculated; if the flag F is "02H", the AND of the color mode flag $C_2$ and the color mode flag B is calculated. If the AND calculated in step S135 is not "00H", since the image recording timing has been reached, VF is permitted in step S136. More specifically, if the flag F is "01H", V1 is permitted; if the flag F is "02H", V2 is permitted. In step S137, an image is recorded in the developing color indicated by the color mode flag B, and the flow advances to step S138.

On the other hand, if it is determined in step S134 that the flag F is "00H", or if it is determined in step S135 that the AND of the color mode flag $C_F$ and the color mode flag B is "00H", the flow jumps to step S138 without executing image recording.

In step S138, the color mode flag B is checked. If the color mode flag B is "01H" or "02H", since it indicates magenta recording on the A or B surface, i.e., recording of the first color, the flow advances to step S139, and the recorded page count $Q_F$ is incremented by 1. As a result of increment in step S139, if it is determined in step S140 that the recorded page count $Q_F$ is equal to the recording page count $P_F$, the number of remaining pages to be recorded is 1, and the flow advances to step S141. In step S141, the color mode flag B is checked. If the color mode flag B is "01H", the flow advances to step S142 to set the color mode $C_F$ to be "55H", i.e., to perform recording of only the A surface. Thereafter, the flow advances to step S146.

On the other hand, if it is determined in step S141 that the flag B is "02H", since it indicates magenta recording on the B surface, the flow advances to step S160 to check if the flag MD is "03H", i.e., if both the 0th and 1st bits of the flag MD are "1" and a local copy request and a remote print request are simultaneously generated. If YES in step S160, the flow advances to step S143 to set the color mode $C_F$ to be executed to be "AAH", i.e., to perform recording of only the B surface. Thereafter, the flow advances to step S146.

On the other hand, if it is determined in step S140 that the recorded page count $Q_F$ is not equal to the recording page count $P_F$, since the number of remaining pages to be recorded is 2 or more, the color mode need not be changed, and hence, the flow jumps to step S146. If it is determined in step S160 that the flag MD is not "03H", since the local copy processing and the remote print processing are simultaneously requested, the flow jumps to step S146 without changing the color mode flag $C_F$, though it indicates recording of the B surface.

If it is determined in step S138 that the color mode flag B is "40H" or "80H", since it indicates black recording on the A or B surface, i.e., recording of the last color, the flow advances to step S144. In step S144, the recorded page count $Q_F$ is compared with the recording page count $P_F$. If these two values are equal to each other, since it means the end of recording, the flow advances to step S145 to set the (F-1)-th bit of the flag MD, i.e., the 0th or 1st bit, to be "0". Thereafter, the flow advances to step S146. On the other hand, if it is determined in step S144 that the recorded page count $Q_F$ is not equal to the recording page count $P_F$, the flow jumps to step S146.

In step S146, it is checked if the color mode flag B is "80H". If YES in step S146, the flow advances to step S148 to update the color mode flag B to be "01H". On the other hand, if NO in step S146, the flow advances to step S147 to double the color mode flag B. More specifically, the value set for recording of the A surface of the color mode flag B is updated to that for recording of the B surface, or the value set for recording of the B surface is updated to that for recording of the A surface of the next color.

The flow advances to step S149 to check if the flag MD indicating a recording state is "03H". If YES in step S149, the flow advances to step S150 to exclusively OR the flags MD and F, and the flag F is updated to the calculated value. More specifically, if the flag MD is "03H", since both the local copy and remote print requests are generated, the flag F="01H" is updated to "02H", or the flag F="02H" is updated to "01H" so as to alternately execute local copy and remote print operations.

On the other hand, if it is determined in step S149 that the flag MD is not "03H", the flow advances to step S151 to update the flag F to the value of the flag MD. More specifically, if the flag MD is "01H" or "02H", since a request from only one image source is generated, the value of the flag F is set to be the same as that of flag MD.

As described above, in this embodiment, the color mode is set based on the respective flags. In the above-mentioned example, the local copy processing is performed when the flag F is "1", and the remote print processing is performed when the flag F is "2". However, the flag value of each processing may replace each other.

Note that the transition states of the above-mentioned flags are illustrated in the timing chart of FIG. 8.

Displays on the operation panel 213 in this embodiment will be described below with reference to FIG. 16.

The image processing apparatus of this embodiment must clearly inform the current operation status to an operator since it operates based on requests from various image sources.

FIG. 16 shows display examples on a character display unit (LCD, CRT, or the like) of the operation panel 213. The operation panel 213 of this embodiment has input means such as the known start key, stop key, ten-key pad, and the like, and display means such as a LCD, LED, and the like other than that shown in FIG. 16, as a matter of course, but a detailed description thereof will be omitted. The respective operation panel states shown in FIG. 16 correspond to the sequence shown in the timing chart in FIG. 8, and a local copy operation of three pages and a remote print operation of three pages are performed.

In this embodiment, when the local copy processing is started, a display a in FIG. 16 is made on the operation panel 213. During execution of the local copy processing of the first and second pages, a message indicating that a local copy operation is being executed, and a message indicating that a remote print operation can be performed are displayed. Also, the set page count and the recorded page count of the local copy operation are displayed. Alternatively, the number of remaining pages to be recorded may be displayed.

Upon completion of the local copy processing of the first and second pages, a display b shown in FIG. 16 is made, and the recorded page count is updated.

At this time, when a remote print request is issued, the remote print processing is started, and a display c shown in FIG. 16 is made. During the magenta recording operation of the remote print processing of the first page, a message indicating that a remote print operation is being executed is displayed, and the set page counts and the recorded page counts of the local copy and remote print operations are displayed. Thus, an operator can recognize that the local copy processing is not completed yet.

When the magenta recording operation of the remote print processing of the first page is completed, and the magenta recording operation of the local copy processing of the third page is being executed, a message indicating that a local copy operation is being executed is displayed, and the count display is also made, as shown in a display state d in FIG. 16. With this display, an operator can recognize that the remote print operation is not completed yet. While the remote print operation of the first page and the local copy operation of the third page are alternately performed, the displays c and d shown in FIG. 16 alternately appear.

When the local copy processing is completed, and the remote print processing of the second and third pages is being executed, a message indicating that a remote print operation is being executed, and a message indicating that a local copy operation can be performed are displayed, as shown in a display state e in FIG. 16. With this display, an operator can know that a local copy operation can be executed even when the image processing apparatus of this embodiment is in operation. Even when the paper size of the local copy or remote print operation is A3 or the like, and "two-sheet attachment" processing is not available, since the set page count and the recorded page count of the remote print operation are displayed, an operator can predict the wait time until the local copy processing is started.

When the remote print processing is also completed, a message indicating that the image processing apparatus is in a standby state is displayed, as shown in a display state f in FIG. 16.

In each status during execution of recording, the current developing color (M, C, Y, Bk) can also be displayed, and it can serve as a measure for an operator upon prediction of the wait time.

As described above, according to this embodiment, since image recording operations from a plurality of image sources are alternately performed, the productivity of the recording operations can be improved. In addition, since a complex operation state of the recording operations from a plurality of image sources can be plainly displayed for an operator, operability can be improved.

Second Embodiment

The second embodiment of the present invention will be described below with reference to FIGS. 17A to 19B.

In the second embodiment, the present invention is applied to a case wherein the above-mentioned first embodiment is further developed.

Since the arrangement of the image processing apparatus of the second embodiment is the same as that of the first embodiment, a detailed description thereof will be omitted.

FIG. 17A illustrates the timings in the local copy and remote print operations in the above-mentioned first embodiment. FIG. 17A shows a state wherein the print operation of an image from the CCD 201 in the first embodiment, i.e., the local copy operation is executed first, and the print operation of an image input from the external apparatus 219, i.e., the remote print operation is started during the local copy operation.

In the present invention, a case opposite to FIG. 17A can be processed based on the same principle as in the first embodiment described above. That is, the present invention is applicable to a case wherein the remote print operation from the external apparatus 219 is executed first, and the local copy operation from the CCD 201 is started during the remote print operation, as shown in FIG. 17B.

In the examples shown in FIGS. 17A and 17B, the preceding operation ends first. However, the present invention is also applicable to a case wherein an operation started later ends during the preceding operation, as shown in FIGS. 18A and 18B.

FIG. 18A shows a case wherein the remote print operation is started and ends during the local copy processing, and the local copy processing is subsequently executed. FIG. 18B shows a case wherein the local copy operation is started and ends during the remote print processing, and the remote print processing is subsequently executed, contrary to the case shown in FIG. 18A.

In the first embodiment described above, full-color images from different image sources are recorded. However, the present invention is not limited to a full-color image as an object to be recorded. For example, the present invention is also applicable to a case wherein one of two images to be recorded is other than a full-color image, e.g., a monochrome image, as shown in FIGS. 19A and 19B.

FIGS. 19A and 19B show processing executed when a full-color image is to be recorded by the local copy processing, and a monochrome black image is to be recorded by the remote print processing. FIG. 19A shows a case wherein Bk recording of the remote print processing is executed between each two adjacent ones of M, C, Y, and Bk recording operations of the local copy processing, and the developing color is switched every half revolution of the transfer drum. On the other hand, FIG. 19B shows a case wherein the remote print processing of Bk is performed only when Bk development is performed in the local copy processing.

In FIG. 19B, the remote print processing of Bk may be performed immediately after execution of Bk development in the local copy processing like a print operation indicated by a solid frame in FIG. 19B, or immediately before execution of Bk development in the local copy processing like a print operation indicated by a dotted frame, or both of these operations may be used. Such an operation mode may be selected in correspondence with the switching time performance of the developing color. Of course, in FIGS. 19A and 19B, the local copy processing and remote print processing may replace each other. In the example shown in FIG. 19B, the execution speed of the remote print processing is lower than that in FIG. 19A. However, the processing speed of the local copy processing can be higher than that in FIG. 19A since the developing color need not be switched for each development.

As described above, according to the second embodiment as well, the same effect as in the first embodiment can be obtained.

Third Embodiment

The third embodiment of the present invention will be described below.

In the first and second embodiments, the remote print processing can be executed anytime during execution of the local copy processing, and vice versa.

As shown in FIG. 8 above, in the first and second embodiments, when a half circumferential portion of the transfer drum is not used, if any interrupt processing is generated, the generated interrupt processing does not decrease the processing speed of processing which is currently being executed. However, in the case of the processing shown in FIG. 8, the preceding processing always fully uses the transfer drum, and the processing speed of the preceding processing is lowered by the interrupt processing. Thus, in the third embodiment, a plurality of processing operations are efficiently executed parallel to each other, and priority levels are assigned to the respective processing operations to execute urgent processing prior to those with lower priority.

Since the arrangement of the image processing of the third embodiment is the same as that in the first embodiment, a detailed description thereof will be omitted.

Figure 20:
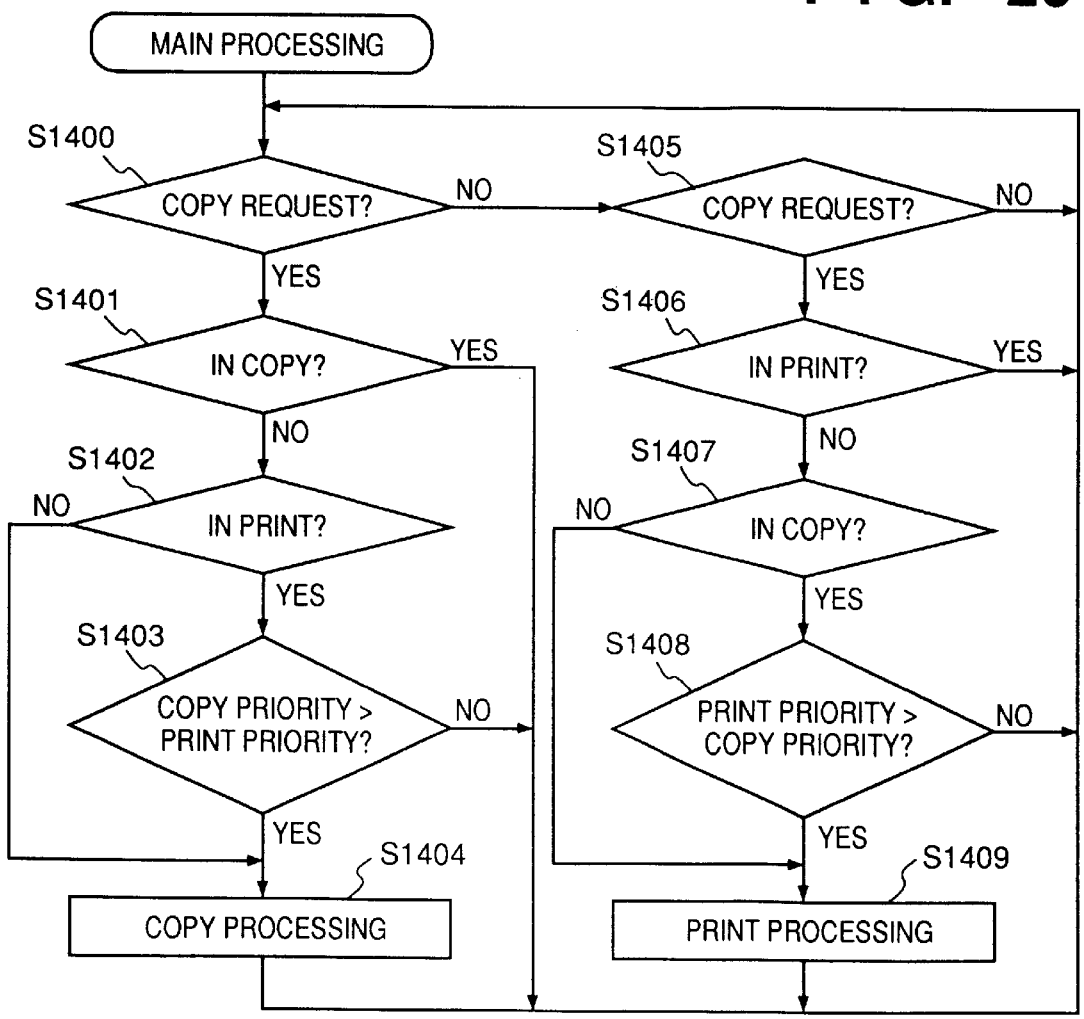
FIG. 20 is a flow chart showing the priority discrimination processing according to the third embodiment of the present invention.

FIG. 20 is a flow chart showing parallel processing in the third embodiment.

The processing shown in FIG. 20 is a portion for discriminating whether or not each interrupt processing request is executed, and corresponds to processing portions in steps S101, S102, S111, and S112 shown in FIG. 9 of the first embodiment described above. Since other processing operations are the same as those in FIG. 9 above, a detailed description thereof will be omitted.

Referring to FIG. 20, in step S1400, the presence/absence of a local copy request is checked. If YES in step S1400, the flow advances to step S1401 to check if the local copy processing has already been started. If NO in step S1401, the flow advances to step S1402 to check if the remote print processing has already been started. If NO in step S1402, the flow advances to step S1404 to execute the local copy processing; otherwise, the flow advances to step S1403 to compare the priority level of the remote print processing in execution with that of the latest local copy request. If it is determined in step S1403 that the priority level of the local copy request is higher than that of the remote print processing, the flow advances to step S1404 to execute the local copy processing; otherwise, the flow returns to step S1400.

If it is determined in step S1400 that a local copy request is not detected, the flow advances to step S1405 to check the presence/absence of a remote print request. If YES in step S1405, the flow advances to step S1406 to check if the remote print processing has already been started. If NO in step S1406, the flow advances to step S1407 to check if the local copy processing has already been started. If NO in step S1407, the flow advances to step S1409 to start the remote print processing; otherwise, the flow advances to step S1408 to compare the priority level of the local copy processing in execution with that of the latest remote print request. If it is determined in step S1408 that the priority level of the remote print request is higher than that of the local copy processing, the flow advances to step S1409 to execute the remote print processing; otherwise, the flow returns to step S1400.

Note that the priority levels of the local copy and remote print operations may be stored in advance in an internal ROM of the image processing apparatus of the third embodiment or the external apparatus 219, or may be stored in a RAM, so that the priority levels can be changed as needed.

As described above, in the third embodiment, priority levels are assigned to the local copy processing and the remote print processing, and an image output operation is executed with reference to the priority levels, thus providing an image processing apparatus with higher operability.

The priority discrimination processing in step S1408 in FIG. 20 above will be described below with reference to FIG. 21.

Figure 21:
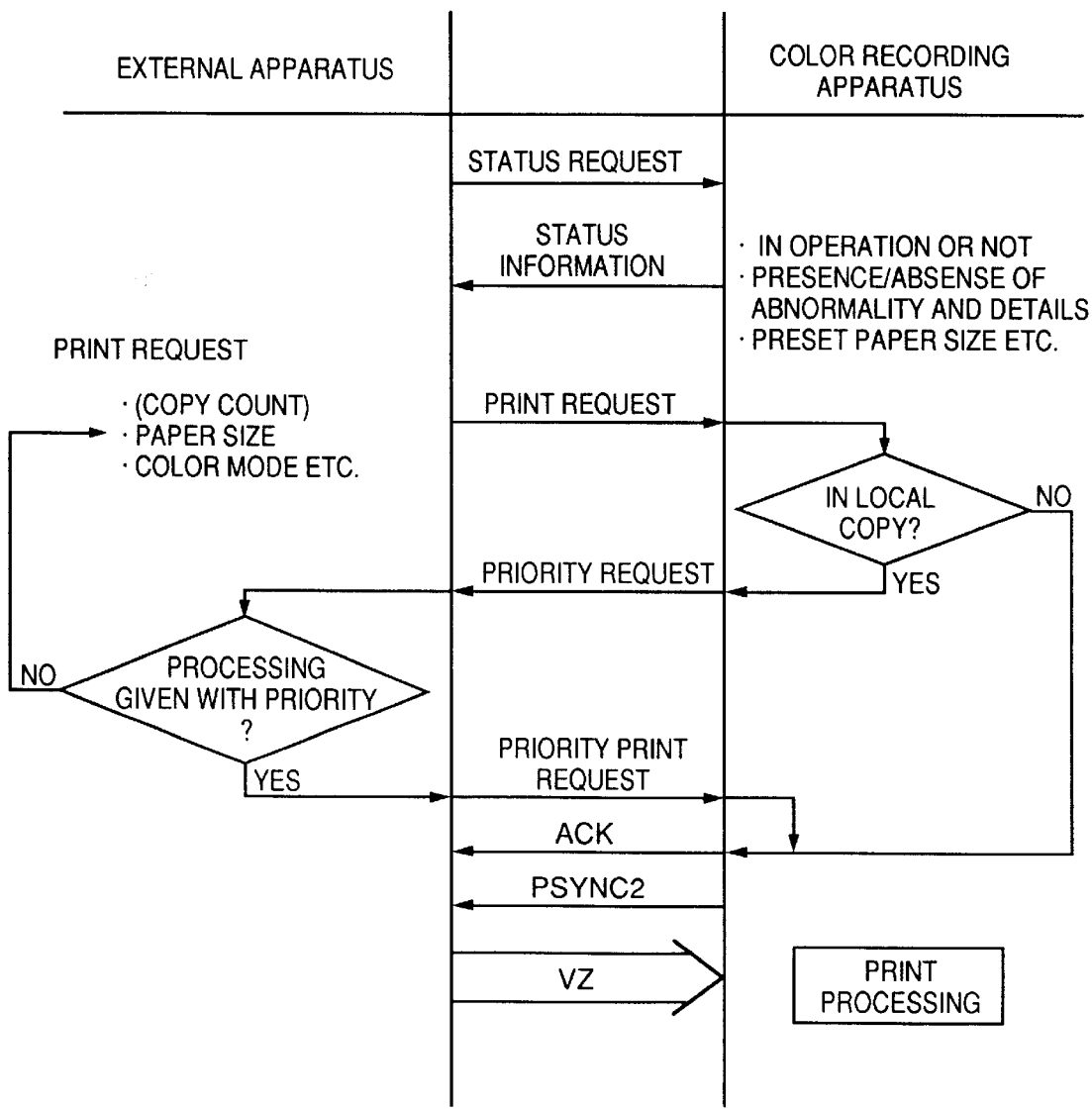
FIG. 21 is a view for explaining the communication protocol in the third embodiment.

FIG. 21 is a view showing priority discrimination processing in a communication protocol between the external apparatus 219 and the color image processing apparatus.

Normally, the external apparatus 219 sends a status request command to the image processing apparatus, and receives, as status data, information which indicates whether or not the apparatus is in operation, the presence/absence of abnormality and the details of the abnormality if present, the preset paper sheet sizes, and the like. When a print request is generated from the external apparatus 219 by an operator via other means such as a public network, LAN, or the like, the external apparatus 219 sends a print request command to the image processing apparatus together with information necessary for the print processing such as a print page count, paper size, color mode, and the like.

When the image processing apparatus, which received the print request command, does not execute local copy processing, it sends back, using ACK status, a message indicating reception of the request to the external apparatus 219, and starts print processing. On the other hand, when the image processing apparatus is executing the local copy processing, it inquires the priority of the print processing to the external apparatus 219. The external apparatus 219 checks if the print processing is given priority. If the print processing is not given priority, the external apparatus 219 temporarily halts printing, and waits until the image processing apparatus is ready. If the external apparatus 219 has priority, it issues a priority print request command to the image processing apparatus, and upon reception of this command, the image processing apparatus preferentially executes the print processing from the external apparatus 219.

The image processing apparatus of the third embodiment is arranged not to execute print processing when it receives a priority print request command from the external apparatus 219 before receiving a normal print request therefrom, thereby preventing meaningless priority discrimination by frequent priority print request commands indiscriminately issued by the external apparatus 219.

As a method of assigning priority in the external apparatus, various methods such as a method of specifying an operator, apparatus, or the like, a method of using a password, and the like are available.

An example of the priority discrimination processing in step S1403 in FIG. 20 above will be described below with reference to FIG. 22.

Figure 22:
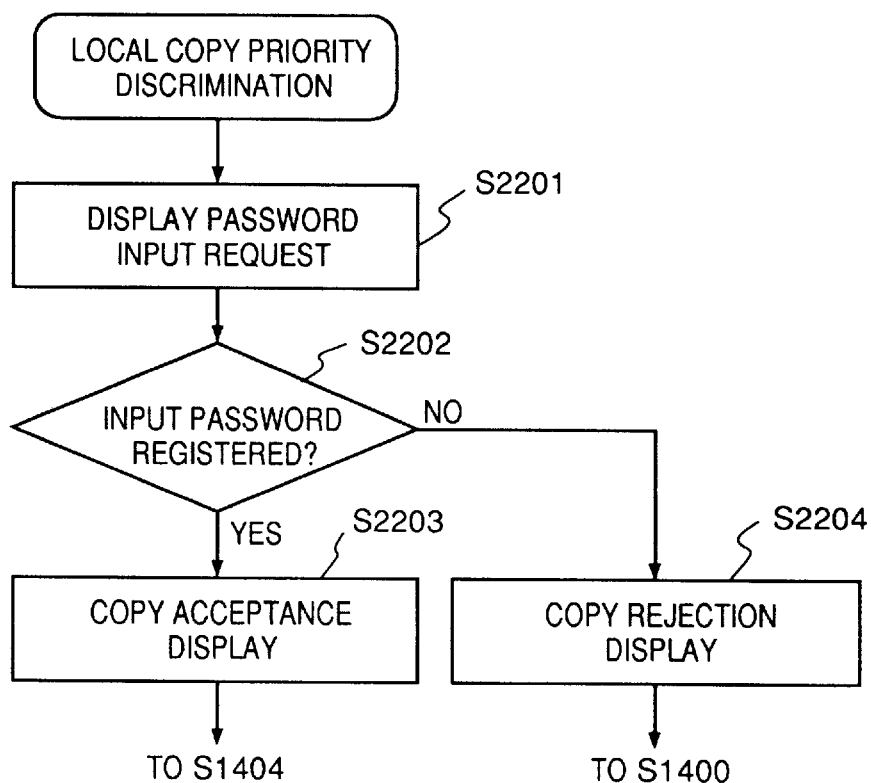
FIG. 22 is a flow chart showing the password discrimination processing in the third embodiment.

FIG. 22 is a flow chart showing an example of security checking using a password.

In step S2201 in FIG. 22, a message for urging an operator to input a password such as "input password" is displayed on the operation panel 213 to request an operator to input a password. The flow advances to step S2202 to check if the input password coincides with a specific password which is registered in advance in, e.g., a nonvolatile memory such as a ROM in the CPU 217. If it is determined in step S2202 that the input password is registered, the flow advances to step S2203 to display a message indicating acceptance of the local copy request such as "copy is accepted", and the copy processing in step S1404 shown in FIG. 20 above is started.

On the other hand, if it is determined in step S2202 that the input password does not coincide with the registered password, the flow advances to step S2204, and a message indicating that the local copy request is rejected such as "copy is rejected due to non-coincidence of password; please wait for end of print" is displayed. Thereafter, the copy request discrimination processing in step S1400 shown in FIG. 20 above is started.

Note that the security checking processing using a password can also be applied to the external apparatus 219.

In the description of the third embodiment, the priority discrimination processing based on a password is performed in step S1403 shown in FIG. 20, and the priority discrimination processing based on the presence/absence of priority is performed in step S1408. However, the present invention is not limited to this. For example, the priority discrimination processing based on the presence/absence of priority may be performed in step S1403, and the priority discrimination processing based on a password may be performed in step S1408.

As described above, according to the third embodiment, since priority levels are assigned to the image processing apparatus and the external apparatus, the local copy and remote print operations can be processed in correspondence with the priority levels. In addition, since security control can be realized by setting a password, the image processing apparatus with higher operability can be provided.

In each of the first to third embodiments, the CCD 34 for reading an original image, and the external apparatus 219 such as a computer have been exemplified as a plurality of image sources. However, the present invention is not limited to these, but may be applied to images input from any other image processing apparatuses such as a computer, facsimile apparatus, optical disk/magnetic disk, and the like.

The number of image sources can be increased to three or more based on the same principle as the present invention. However, in this case, since a maximum of two recording media can only be attracted on the transfer drum, an image source to be subjected to recording can be arbitrarily determined according to the apparatus characteristics or as an operator demands.

In each of the first to third embodiments described above, an image from the external apparatus is received as image information which is converted into that in a color space of developing colors M, C, Y, and Bk. For example, in FIG. 2, image information from the external apparatus may be received as information in an color space between the input masking unit 204 and the light amount/density converter 205, or information in other color spaces may be used.

Even when an image to be output is subjected to various kinds of image processing, the present invention is applicable, as a matter of course.

In each of the first to third embodiments described above, images input from a plurality of image sources are alternately output onto recording media. However, the present invention is not limited to this. For example, these images may be output to image output means other than recording media such as a storage device.

As described above, according to the present invention, images from a plurality of image sources can be efficiently processed without limiting image generating apparatuses or without limiting the formats of input images.

Note that the present invention may be applied to either a system constituted by a plurality of devices or an apparatus consisting of a single device. The present invention is also applicable to a case wherein the invention is achieved by supplying a program to a system or apparatus.

The present invention is not limited to the above embodiments and various changes and modification can be made within the spirit and scope of the present invention. Therefore, to apprise the public of the scope of the present invention the following claims are made.

What is claimed is:

1. An image processing apparatus comprising:
   a plurality of input means for inputting image signals transmitted from a plurality of image sources; and
   image forming means for forming a plurality of frame images onto an image forming area thereof, on the basis of an image signal input by any one of said plurality of input means;
   wherein, in a case two image signals are input by two input means of said plurality of input means, said image forming means forms frame images onto said image forming area alternately on the basis of said two image signals respectively.

2. The apparatus according to claim 1, further comprising output means for outputting the plurality of frame images by adhering a plurality of recording media on said image forming area.

3. The apparatus according to claim 2, further comprising:
   informing means for informing image information which is being output by said output means.

4. The apparatus according to claim 2, wherein said output means controls an output operation by generating a signal for requesting output of an image for one page with respect to each of the images formed by said image forming means.

5. The apparatus according to claim 4, wherein the signal for requesting output of an image for one page is a vertical synchronization signal.

6. The apparatus according to claim 1, wherein said image forming means forms a full-color image.

7. The apparatus according to claim 6, further comprising:
   output means for outputting the plurality of full-color frame images by adhering a plurality of recording media on said image forming area.

8. The apparatus according to claim 1, wherein said plurality of input means include means for reading an original image and inputting the read image, and input means for inputting an image signal from an external apparatus.

9. An image processing apparatus comprising:
   a plurality of input means for inputting image signals transmitted from a plurality of image sources; and
   image forming means for forming a plurality of frame images onto an image forming area thereof, on the basis of an image signal input by any one of said plurality of input means;
   wherein, in a case two image signals are input by two input means of said plurality of input means, said image forming means forms first frame images on the basis of one of said two image signals, and said image forming means forms second frame images on the basis of the other of said two image signals,
   wherein said image forming means forms a last frame image of said first frame images and a forefront frame image of said second frame images sequentially onto different frame areas of said image forming area.

10. The apparatus according to claim 9, further comprising output means for outputting the plurality of frame images by adhering a plurality of recording media on said image forming area.

11. The apparatus according to claim 9, wherein said image forming means forms a full-color image.

12. The apparatus according to claim 11, further comprising:
    output means for outputting the plurality of full-color frame images by adhering a plurality of recording media on said image forming area.

13. The apparatus according to claim 9, further comprising:
    informing means for informing image information which is being output by said output means.

14. The apparatus according to claim 9, wherein said output means controls an output operation by generating a signal for requesting output of an image for one page with respect to each of the images formed by said image forming means.

15. The apparatus according to claim 14, wherein the signal for requesting output of an image for one page is a vertical synchronization signal.

16. The apparatus according to claim 9, wherein said plurality of input means include first input means for reading an original image, and second input means for receiving an image signal from an external apparatus.

17. An image processing method comprising the steps of:
    inputting image signals transmitted from a plurality of image sources; and
    forming a plurality of frame images onto an image forming area for holding formed images, on the basis of the input image signals;
    wherein, in a case two input image signals are input, frame images are formed onto said image forming area alternately on the basis of the two input image signals respectively.

18. The method according to claim 17, wherein the plurality of frame images are output by adhering a plurality of recording media on said image forming area.

19. The method according to claim 17, wherein full-color images are formed based on the input image signals, and the formed full-color images are output.

20. The method according to claim 17, further comprising the step of:
    informing image information, which is being output, to an operator.

21. The method according to claim 17, wherein an output operation is controlled by generating a signal for requesting output of an image for one page with respect to each of the formed images.

22. The method according to claim 21, wherein the signal for requesting output of an image for one page is a vertical synchronization signal.

23. The method according to claim 17, wherein the plurality of image signals include an image signal read by a scanner, and an image signal input from an external apparatus.

24. An image processing apparatus comprising:
    a plurality of input means for inputting image signals transmitted from a plurality of image sources;
    image forming means for forming a plurality of frame images onto an image forming area thereof, on the basis of an image signal input by any one of said plurality of input means; and
    priority comparison means for comparing priority levels of image signals input by at least two input means of said plurality of input means;
    wherein said image forming means forms frame images on the basis of an image signal having a lower priority level after completion of forming frame images on the basis of an image signal having a higher priority level.

25. The apparatus according to claim 24, wherein said image forming means forms a full-color image.

26. The apparatus according to claim 25, wherein said apparatus is capable of forming a first color component for first and second images, and then capable of forming a second color component for the first and second images.

27. The apparatus according to claim 24, further comprising:
informing means for informing information relating to an image which is being formed.

28. The apparatus according to claim 24, further comprising:
means for generating a signal for requesting output of image for one page with respect to each of the images formed by said image forming means.

29. The apparatus according to claim 28, wherein the signal for requesting output of an image for one page is a vertical synchronization signal.

30. The apparatus according to claim 24, wherein said plurality of input means include first input means for reading an original image, and second input means for receiving an image signal from an external apparatus.

31. The method according to claim 30, wherein a first color component for first and second images is formed, and then a second color component for the first and second images is formed.

32. An image processing method comprising the steps of:
inputting image signals transmitted from a plurality of image sources; and
forming a plurality of frame images onto an image forming area for holding formed images, on the basis of the input image signal;
wherein, in the case two image signals are input, first frame images are formed on the basis of one of said two image signals, and second frame images are formed on the basis of the other of said two image signals,
wherein a last frame image of said first frame images and a forefront frame image of said second frame images are formed sequentially onto different from areas of said image forming area.

33. A method according to claim 32, further comprising the step of:
outputting the plurality of frame images by adhering a plurality of recording media on said image forming area.

34. The method according to claim 33, further comprising the step of:
informing image information, which is being output, to an operator.

35. The method according to claim 33, wherein an output operation is controlled by generating a signal for requesting output of an image for one page with respect to each of formed images.

36. The method according to claim 35, wherein the signal for requesting output of an image for one page is a vertical synchronization signal.

37. The method according to claim 32, wherein full-color images are formed on the basis of the input image signal.

38. The method according to claim 37, further comprising the step of:
outputting the plurality of full-color frame images by adhering a plurality of recording media on said image forming area.

39. The method according to claim 32, wherein the plurality of image signals include an image signal read by a scanner, and an image signal received from an external apparatus.

40. An image processing method comprising the steps of:
inputting image signals transmitted from a plurality of image sources, by a plurality of input means;
forming a plurality of frame images onto an image forming area for holding formed images, on the basis of the input image signal; and
comparing priority levels of image signals input by at least two input means of said plurality of input means,
wherein frame images are formed on the basis of an image signal having a lower priority level, after completion of forming frame images on the basis of an image signal having a higher priority level.

41. The method according to claim 40, wherein full-color images are formed on the basis of the input image signal.

42. The method according to claim 40, further comprising the step of:
informing information relating to an image which is being formed.

43. The method according to claim 40, further comprising the step of:
generating a signal for requesting output of an image for one page with respect to each of the formed images.

44. The method according to claim 43, wherein the signal for requesting output of an image for one page is a vertical synchronization.

45. The method according to claim 40, wherein the plurality of image signals include an image signal read by a scanner, and an image signal received from an external apparatus.

46. An image processing apparatus, comprising:
input means for inputting an image signal; and
image forming means for forming a plurality of frame images on different portions of an image forming area based on a print request and the image signal input by said input means;
wherein in a case where a second input request which request to print at least one frame image is input by said input means while said image forming means is forming the plurality of frame images on the image forming area based on a first print request, a processing of forming a frame image based on the second print request is interleaved in a processing of forming the plurality of frames of images based on the first print request.

47. The apparatus according to claim 46, wherein said image forming means transfers the plurality of frame images on plural recording mediums attached on the image forming area.

48. The apparatus according to claim 47, wherein said image forming means generates a request signal for forming a frame and controls an operation of image forming in accordance with the request signal.

49. The apparatus according to claim 48, wherein the request signal for forming a frame image is a vertical synchronizing signal.

50. The apparatus according to claim 46, wherein said image forming means forms a full color image.

51. The apparatus according to claim 46, further comprising:
comparison means for comparing the priority of each print request in a case where a plurality of print requests are input;
wherein said image forming means forms a frame image corresponding to a print request having a higher priority based on a comparison result by said comparison means.

52. The apparatus according to claim 46, further comprising:
informing means for informing a print request on which said image forming means forms an image.

53. The apparatus according to claim 46, wherein said input means includes means for inputting an image signal by optically reading an original, and means for inputting an image signal from an external device.

54. An image processing method, comprising the steps of:
inputting an image signal; and
forming a plurality of frame images on different portions of an image forming areas based on a print request and the image signal input by said input means;
wherein in a case where a second input request which request to print at least one frame image is input in said input step while forming the plurality of frame images on the image forming area based on a first print request, a processing of forming a frame image based on the second print request is interleaved in a processing of forming the plurality of frame images based on the first print request.

55. The method according to claim 54, wherein in said forming step, the plurality of frame images are transferred on plural recording mediums attached on the image forming area.

56. The method according to claim 55, wherein in said forming step, a request signal for forming a frame image is generated and an operation of image forming is controlled in accordance with the request signal.

57. The method according to claim 56, wherein the request signal for forming a frame image is a vertical synchronizing signal.

58. The method according to claim 54, wherein in said forming step, a full color image is formed.

59. The method according to claim 54, further comprising:
a step of comparing the priority of each print request in a case where a plurality of print requests are input;
wherein in said forming step, a frame image corresponding to a print request having a higher priority is formed based on a comparison result in said comparing step.

60. The method according to claim 54, further comprising a step of informing a print request on which an image is formed in said forming step.

61. The method according to claim 54, wherein said inputting step includes either a step of inputting an image signal by optically reading an original, or a step for inputting an image signal from an external device.

62. An image processing apparatus, comprising:
input means for inputting an image signal; and
image forming means for forming a plurality of frame images on different portions of an image forming area based on a print request and the image signal input by said input means;
wherein in a case where a second print request is input by said input means while said image forming means is forming the plurality of frame images on said image forming area based on a first print request, said image forming means forms a last frame image based on said first print request and a forefront frame image based on said second print request sequentially on different portions of said image forming area.

63. The apparatus according to claim 62, further comprising output means for outputting the plurality of frame images by adhering a plurality of recording media on said image forming area.

64. The apparatus according to claim 62, wherein said image forming means forms a full-color image.

65. The apparatus according to claim 64, further comprising output means for outputting the plurality of full-color frame images by adhering a plurality of recording media on said image forming area.

66. The apparatus according to claim 63, further comprising informing means for informing image information which is being output by said output means.

67. The apparatus according to claim 63, wherein said output means controls an output operation by generating a signal for requesting output of an image for one page with respect to each of the images formed by said image forming means.

68. The apparatus according to claim 67, wherein the signal for requesting output of an image for one page is a vertical synchronization signal.

69. The apparatus according to claim 62, wherein said input means includes first input means for reading an original image, the second input means for receiving an image signal from an external apparatus.

70. An image processing method comprising the steps of:
inputting an image signal; and
forming a plurality of frame images on different portions of an image forming area based on an input print request and the input image signal;
wherein in a case where a second print request is input while forming the plurality of frame images on the image forming area based on a first print request, a last frame image based on the first print request and a forefront frame image based on the second print request are sequentially formed on different portions of the image forming area.

71. The method according to claim 70, further comprising a step of outputting the plurality of frame images by adhering a plurality of recording media on the image forming area.

72. The method according to claim 70, wherein in said image forming step, a full-color image is formed.

73. The method according to claim 72, further comprising a step of outputting the plurality of full-color frame images by adhering a plurality of recording media on the image forming area.

74. The method according to claim 71, further comprising a step of informing image information which is being output in said outputting step.

75. The method according to claim 71, wherein in said outputting step, an output operation is controlled by generating a signal for requesting output of an image for one page with respect to each of the image formed in said image forming step.

76. The method according to claim 75, wherein the signal for requesting output of an image for one page is a vertical synchronization signal.

77. The method according to claim 70, wherein said inputting step includes first inputting step of reading an original image, and a second inputting step of receiving an image signal from an external apparatus.

* * * * *

UNITED STATES PATENT AND TRADEMARK OFFICE
CERTIFICATE OF CORRECTION

PATENT NO. : 5,883,724
DATED : March 16, 1999
INVENTOR(S) : Masanori Yamada

It is certified that error appears in the above-identified patent and that said Letters Patent is hereby corrected as shown below:

COLUMN 1

Line 30, "is" should read --is prolonged--.

COLUMN 20

Line 4, "claim 9," should read --claim 10,--; and
Line 8, "claim 9," should read --claim 10,--; and

COLUMN 21

Line 37, "from" should be deleted; and
Line 21, "method" should read --apparatus--.

COLUMN 23

Line 12, "areas" should read --area--.

COLUMN 24

Line 53, "image" (first occurrence) should read --images--.

Signed and Sealed this

Twenty-first Day of September, 1999

Attest:

Q. TODD DICKINSON

*Attesting Officer*      *Acting Commissioner of Patents and Trademarks*